United States Patent
Launay et al.

(10) Patent No.: US 12,415,350 B2
(45) Date of Patent: Sep. 16, 2025

(54) COMPUTER-IMPLEMENTED METHOD FOR DETERMINING PRINTING PARAMETER VALUES OF AN INKJET PRINTING DEVICE, A DATA PROCESSING SYSTEM, A METHOD FOR INKJET PRINTING AND AN INKJET PRINTING DEVICE

(71) Applicant: Carl Zeiss Vision International GmbH, Aalen (DE)

(72) Inventors: Florian Launay, Aalen (DE); Christian Wolff, Aalen (DE); Harshvardhan Yadwad, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/437,375

(22) Filed: Feb. 9, 2024

(65) Prior Publication Data
US 2024/0208206 A1 Jun. 27, 2024

Related U.S. Application Data

(63) Continuation of application No. PCT/EP2022/075053, filed on Sep. 9, 2022.

(30) Foreign Application Priority Data

Sep. 10, 2021 (EP) .................................... 21195947

(51) Int. Cl.
*B41J 2/045* (2006.01)
*B41M 3/00* (2006.01)

(52) U.S. Cl.
CPC ....... *B41J 2/04541* (2013.01); *B41J 2/04505* (2013.01); *B41M 3/003* (2013.01)

(58) Field of Classification Search
CPC ..... B41J 2/0454; B41J 2/04541; B41J 3/4073
See application file for complete search history.

(56) References Cited

U.S. PATENT DOCUMENTS 6,295,737 B2 * 10/2001 Patton .................... B41J 3/4073
33/511
9,492,997 B2 * 11/2016 Zhang .................... B41J 2/0454
(Continued)

FOREIGN PATENT DOCUMENTS

CN 110073280 A 7/2019
CN 113165290 A 7/2021
(Continued)

OTHER PUBLICATIONS

Industrial Norm "Information Technology—Vocabulary (ISO 2382:2015)," English version En Iso 2382:2015, available at https://www.iso.org/obp/ui/en/#iso:std:iso-iec:2382:ed-1:v2:en, last accessed Feb. 8, 2024.
(Continued)

*Primary Examiner* — Lam S Nguyen
(74) *Attorney, Agent, or Firm* — Tautz & Schuhmacher LLC; Georg Hasselmann

(57) ABSTRACT

A computer-implemented method for determining printing parameter values of an inkjet printing device for printing a pattern on a surface of a spectacle lens substrate is provided. The inkjet printing device includes a printhead with a plurality of printing nozzles. The method includes: grouping the plurality of printing nozzles into at least two printing nozzle groups, and individually determining a printing parameter value for at least one adjustable printing parameter of each printing nozzle group. In addition, a data processing system, a computer program, a non-transitory computer-readable storage medium, a method for inkjet printing, an inkjet printing device, and a spectacle lens (Continued)

substrate with a pattern printed on a surface of the spectacle lens substrate are provided.

20 Claims, 16 Drawing Sheets

(56) References Cited

U.S. PATENT DOCUMENTS

| | | |
|---|---|---|
| 2003/0085934 A1 | 5/2003 | Tucker et al. |
| 2004/0037514 A1 | 2/2004 | Marion et al. |
| 2013/0000499 A1 | 1/2013 | Ookubo et al. |
| 2015/0277143 A1 | 10/2015 | Leppens et al. |
| 2019/0310492 A1 | 10/2019 | Gromotka |
| 2020/0171852 A1 | 6/2020 | Cofler |
| 2022/0048066 A1 | 2/2022 | Luderich et al. |

FOREIGN PATENT DOCUMENTS

| | | | |
|---|---|---|---|
| DE | 102007037730 A1 | | 2/2009 |
| EP | 2555043 A1 | | 2/2013 |
| EP | 3 115 215 A1 | | 1/2017 |
| JP | H0890776 A | * | 4/1996 |
| JP | 2004004503 A | | 1/2004 |
| JP | 2020-032726 A | | 3/2020 |
| JP | 2020-052323 A | | 4/2020 |
| TW | 200300113 A | | 5/2003 |
| WO | 0173492 A1 | | 10/2001 |
| WO | 03023684 A1 | | 3/2003 |
| WO | 2010084272 A1 | | 7/2010 |
| WO | 2011/125844 A1 | | 10/2011 |
| WO | 2014053716 A1 | | 4/2014 |
| WO | 2018197003 A1 | | 11/2018 |
| WO | 2020079624 A1 | | 4/2020 |

OTHER PUBLICATIONS

Industrial Norm "Ophthalmic optics—Spectacle lenses—Vocabulary (ISO 13666:2019)," English version EN ISO 13666:2019, Dec. 2019.

Industrial Norm Robotics—Vocabulary (ISO 8373:2021), English version EN ISO 8373:2021, Nov. 2021.

European Search Report issued in EP 21 195 947.3, to which this application claims priority, mailed Feb. 17, 2022.

International Search Report and Written Opinion issued in PCT/EP2022/075053, to which this application claims priority, mailed Dec. 8, 2022.

Written Opinion issued in PCT/EP2022/075053, to which this application claims priority, mailed Dec. 8, 2022.

International Preliminary Report on Patentability issued in PCT/EP2022/075053, to which this application claims priority, mailed Sep. 7, 2023.

Office Action by the Chinese Patent Office (SIPO) issued in CN 202280057751.X, which is a counterpart hereof, mailed on May 25, 2024, and English-language translation thereof.

Office Action by the Japanese Patent Office (JPO) issued in JP 2024-038784, which is a counterpart hereof, mailed on Sep. 10, 2024, and English translation thereof.

Office Action by the Japanese Patent Office (JPO) issued in JP 2024-515365, which is a counterpart hereof, mailed on Aug. 6, 2024, and English translation thereof.

Office Action by the Chinese Patent Office (CIPO) issued in CN 202410519362.5, which is a counterpart hereof, mailed on Feb. 21, 2025, and English-language translation thereof.

Office Action by the Chinese Patent Office (CIPO) issued in CN 202410519362.5, which is a counterpart hereof, mailed on Sep. 19, 2024, and English-language translation thereof.

* cited by examiner

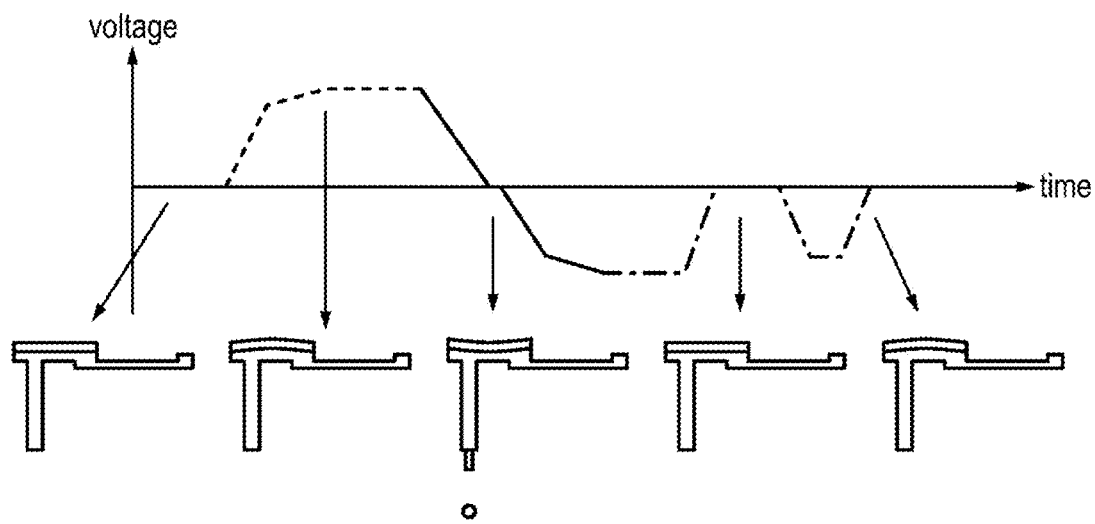
Related art  FIG. 3
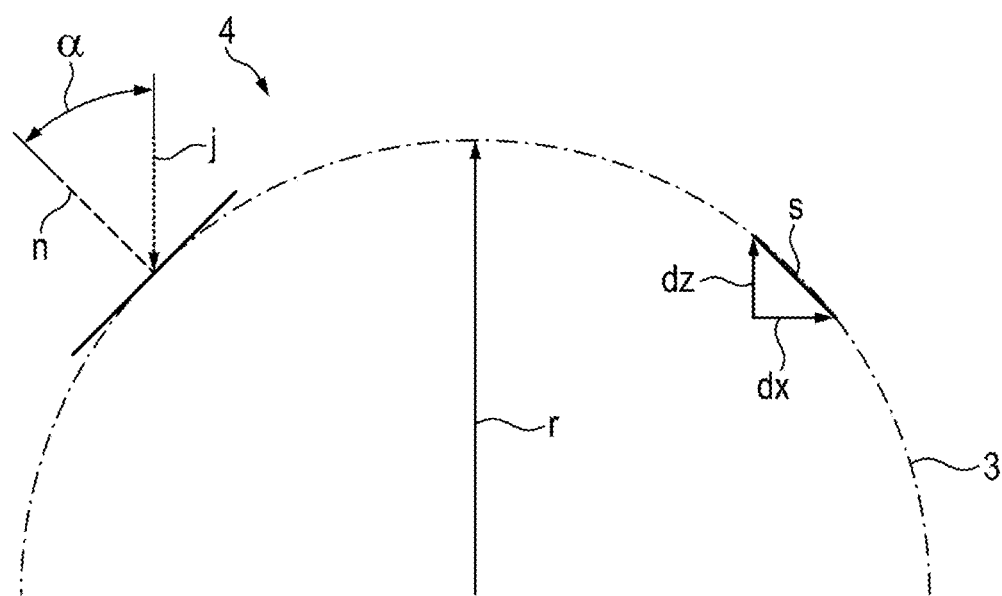
FIG. 4

COMPUTER-IMPLEMENTED METHOD FOR DETERMINING PRINTING PARAMETER VALUES OF AN INKJET PRINTING DEVICE, A DATA PROCESSING SYSTEM, A METHOD FOR INKJET PRINTING AND AN INKJET PRINTING DEVICE

CROSS REFERENCE TO RELATED APPLICATIONS

This application is a continuation application of international patent application PCT/EP2022/075053, filed on Sep. 9, 2022 and designating the U.S., which claims priority to European patent application EP 21 195 947.3, filed on Sep. 10, 2021, both of which are hereby incorporated by reference in their entireties.

TECHNICAL FIELD

The present disclosure relates to a computer-implemented method for determining printing parameter values of an inkjet printing device for printing a pattern on a surface of a spectacle lens substrate, the inkjet printing device including a printhead with a plurality of printing nozzles, a data processing system, a computer program, a non-transitory computer-readable storage medium, a method for inkjet printing, an inkjet printing device, and a spectacle lens substrate with a pattern printed on a surface of the spectacle lens substrate.

BACKGROUND

Inkjet technology is used for different purposes in the area of spectacle lenses, for example for permanent or temporary lens marking as disclosed in WO 2010/084 272 A1 and WO 2014/053 716 A1.

DE 10 2007 037 730 A1 discloses a method for producing a spectacle lens wherein a first and a second marking are provided on, in or under the surface of a first and second optical active area, respectively. The second marking has a predetermined three-dimensional positional relation to the first marking. Both markings can be applied by inkjet printing.

Moreover, inkjet printing can be used for applying a masking on a partial region of a surface of a coated or uncoated spectacle lens as disclosed in US 2019/0 310 492 A1. The inkjet printing process disclosed therein is regarded as the closest related art for the present disclosure.

Related art inkjet printers used in the ophthalmic lens industry use "flat bed" printheads optimized for the targeted material application onto flat surfaces. Thus, these printers provide good results especially for flat and low curvature spectacle lenses. During the jetting process, nozzles are filled with and emptied off (=jetting of droplets) ink by making use of shockwaves stemming from piezoelectric actuation. The latter can be finely controlled by applying a certain voltage profile to them. Typical solid ink printers operate from 300 to 1000 dpi and jetting frequencies of 10 to 50 kHz. Among others, adjustable parameters are firing frequency, waveform, norm, and jetting temperature.

However, the inventors of the present disclosure became aware of printing quality issues when using inkjet technology for spectacle lenses with higher curvature. They found out that different areas of the lenses were printed upon with varying quality. For high curvature spectacle lenses, the printing quality severely degrades towards the edges of the spectacle lens. This was seen as a direct consequence of the mismatch between bar-like shaped related art industrial printheads and non-planar, e.g., spherical or freeform, spectacle lens surfaces having optical powers. For example, the current portfolio of the applicant of the present patent application makes use of blank with true front curve radii of 40 mm to 1000 mm.

WO 03/023 684 A1 deals with the production of three-dimensional decorated objects from flat substrates. If the substrate is decorated prior to the production process the decoration can be misaligned and deformed due to flowing and stretching of the substrate to conform to the shape of the mold or die during the production process. If the substrate is decorated after the production process the distortion of the decoration can be eliminated. However, due to the three-dimensional shape prior to decoration the decoration process is complicated and expensive. An adapted pre-decorating technique employs a purposely distorted decoration which is applied to the flat substrate. As the shape and surface of the substrate change during production, the distorted decoration is intended to transform to its desired appearance. Analogous problems are described in the field of in-mold decoration and insert-mold decoration as well as in the field of image projection on curved surfaces.

To address these problems, WO 03/023 684 A1 suggests a system and method for transforming the appearance of an image with a computer to adapt the image to the topography of a substrate to which the image is to be applied. The suggested method comprises measuring the topography of the substrate and transforming the untransformed graphical image into a transformed graphical image in accordance with measurements of the substrate's topography. This method, however, requires a complex determination of the substrate topography. Moreover, although WO 03/023 684 A1 mentions inkjet printing as a suitable method for applying the transformed graphical image onto the substrate the influence of the application method on the image distortion is not taken into account.

WO 01/73 492 A2 discloses a method for applying lenticular technology to curved surfaces so that the viewer experiences little image distortion. The method comprises preparing an interlaced image for application to a curved surface which comprises two or more frames such that when the interlaced image was viewed through a lenticular lens from a predetermined viewing distance, the interlaced image was viewed substantially free of distortion. The interlaced image can be printed by inkjet printing. However, the influence of inkjet printing method on image distortion is not discussed.

WO 2018/197003 A1 discloses a system and method for coating a lens using a plurality of inkjet printheads arranged in-line. Based on the image to be printed on the lens, a plurality of image layers based on the lens geometry, target product, and number of printheads is generated. At least two of the plurality of inkjet printheads are used to print the image on the lens, such that each of the at least two printheads prints at least one image layer of the plurality of image layers. To print the image, several printing passes associated with movement of either the printheads and/or the lens are required. Thus, an appropriate hardware arrangement for moving is needed and the overall process can be time consuming.

EP 2 555 043 A1 discloses a method for inkjet printing a spectacle lens with markings. Depending in particular on the surface properties of the lens, e.g., the properties of a coating applied to it, printing parameter values are selected differently. Individualization therefore takes place for each lens, but each lens is coated with the same parameter values for each printing nozzle. Thus, the printing results may not be satisfactory due to the curvature of the lens.

WO 2020/079624 A1 discloses a method for locating a glass support in movement and a method for printing an image on a glass support comprising the locating method.

SUMMARY

With respect to the mentioned related art, it is an objective of the present disclosure to provide a method that allows for inkjet printing a printing pattern on a surface, for example a curved surface, of a spectacle lens substrate with enhanced properties of the printing pattern.

It is a further objective of the present disclosure to provide a data processing system, a method for inkjet printing, and an inkjet printing device which enable better printing results on surfaces of spectacle lens substrates, especially curved surfaces.

The first objective is achieved by computer-implemented methods for determining printing parameter values including individually determining a printing parameter value for at least one adjustable printing parameter of each printing nozzle group for at least two printing nozzle groups. The further objective is achieved by a data processing system, a method for inkjet printing, and an inkjet printing device as disclosed herein.

Throughout this specification the following definitions apply:

The term "adjustable ink property" refers to a property of the ink that can in principle be adjusted by the user, e.g., the ink temperature, solid content of the ink etc.

The term "analyzing data" refers to data that was obtained by analyzing a printed pattern, e.g., by light microscopy or white light interferometry.

The term "arc length" refers to the distance between two points on the surface of the spectacle lens substrate measured along the surface (see FIG. 4)

A surface is called "aspherical" if it is a part of a surface of revolution having a continuously variable curvature over all or part of its area (ISO 13666:2019(E), section 3.4.3).

The term "computer" refers to a functional unit that can perform substantial computations, including numerous arithmetic operations and logic operations without human intervention. A computer may consist of a stand-alone unit or several interconnected units (ISO/IEC 2382:2015).

The term "computer-implemented" is an expression intended to cover claims which involve computers, computer networks or other programmable apparatus wherein at least one feature is realized by means of a computer program. For example, a computer-implemented method is a method being actually performed on a computer.

The term "computer program" refers to a sequence of computer-executable instructions specifying a method. It is a syntactic unit that conforms to the rules of a particular programming language and that is composed of declarations and statements or instructions needed to solve a certain function, task, or problem (ISO/IEC 2382:2015).

The term "cost function" refers to a more-dimensional mathematical function defining the costs of a certain set of printing parameter values corresponding to a specific group of points on the surface of the spectacle lens substrate. A certain path within the cost function defining low or even minimal costs is used to deduce the parameter map. The cost may be defined be one or more quality parameters, e.g., the better the quality parameters the lower the costs. Depending on the concrete application, the weight of different quality parameters within the cost function may be changed, i.e., one or more certain quality parameter can be emphasized by allocating them a higher weight compared to other quality parameters.

The term "curved surface" refers to a surface that is not planar and exhibits a concave or convex section, or both.

The term "data" refers to reinterpretable representation of information in a formalized manner suitable for communication, interpretation, or processing (ISO/IEC 2382:2015).

The term "data processing" refers to the systematic performance of operations upon data, for example, arithmetic or logic operations upon data, merging or sorting of data, assembling or compiling of programs, or operations on text, such as editing, sorting, merging, storing, retrieving, displaying, or printing (ISO/IEC 2382:2015).

The term "data processing system" refers to one or more computers, peripheral equipment, and software that perform data processing (ISO/IEC 2382:2015).

The term "displacement vector" refers to a geometric object that has a magnitude or length, respectively, and a direction and that describes the position of the spectacle lens substrate and the printhead relative to each other, possibly referring to a certain reference point.

The term "distance" refers to the length of space between two points. Unless otherwise specified, it refers to the length of the shortest straight line of the two points.

The term "ejection temperature" refers to a printing parameter describing the temperature at the tip of the printing nozzle.

The term "environmental condition" refers to conditions in the environment of the spectacle lens substrate and the inkjet printing device to be used for printing the pattern on the surface of the spectacle lens substrate, e.g., ambient temperature, ambient humidity etc.

A "freeform surface" is to be understood as a complex surface which can be represented in particular by means of area-wise defined functions, in particular twice continuously differentiable area-wise defined functions. Examples for suitable area-wise defined functions are (in particular piecewise) polynomial functions (in particular polynomial splines, such as bicubic splines, higher degree splines of fourth degree or higher, or polynomial non-uniform rational B-splines (NURBS)). To be distinguished from this are simple surfaces, such as spherical surfaces, aspherical surfaces, cylindrical surfaces, toroidal surfaces, which are described as a circle along at least one principal meridian. In particular, a freeform surface does not need to exhibit axial symmetry or point symmetry and can have different values for the mean surface refractive index in different areas of the surface. A spectacle lens exhibiting a freeform surface can be regarded as power-variation lens according to ISO 13666: 2019 (E), section 3.7.7, i.e., as a spectacle lens with a smooth variation of focal power over part or all of its area, with discontinuity, designed to provide more than one focal power.

The term "geometric feature" refers to geometric properties of the spectacle lens substrate, e.g., its dimensions, its surface curvature, etc., and the printhead, e.g., its dimensions, orientation, spacing of individual nozzles, arrangement of the nozzles, etc. The surface curvature can, for example, be described by the surface sag function.

The term "geometric relationship" refers to the alignment of the printhead and the spectacle lens substrate relative to each other. It can be described by the displacement vector, the velocity vector, incident angle $\alpha$, distance, or arc length s, for example.

The term "gray level" refers to the number of drop sizes that a nozzle can produce including the "null drop" when no drop is jetted.

The term "incident angle" refers to the angle α between the normal vector n of a certain point on the surface of the spectacle lens substrate and the ejection vector j at which the ejected ink is transferred from the nozzle to the lens surface (see FIG. 4).

The term "ink" refers to any composition regardless of its color that can be deposited droplet by droplet in an inkjet printing process ("to-be-jetted-material"). To enable or facilitate the formation and deposition of droplets it might be required to heat the ink to a certain temperature.

The term "inkjet printing" refers to drop-on-demand inkjet printing which is a non-contact method of creating a pattern on a surface by discrete deposition of ink droplets. Inkjet printing is carried out by an inkjet printing device comprising a printhead with a plurality of printing nozzles.

The term "input data" refers to data entered into a data processing system or any of its parts for storage or processing. It may also refer to data being received or to be received by any component part of a computer (ISO/IEC 2382:2015).

The term "instructions" refers to a specification of an operation and identification of any associated operands (ISO/IEC 2382:2015).

The term "jetting duration" refers to a printing parameter describing the time period during which ink is ejected from a certain printing nozzle.

The term "jetting frequency" refers to a printing parameter describing the number of jetting events per time period, e.g., per second or per minute, of a certain printing nozzle. Usual jetting frequencies are in the kilohertz area, for example between 10 to 50 kHz.

The term "look-up table" refers to a data array correlating different parameters, e.g., parameters describing the geometric relationship between the surface of the spectacle lens substrate and the printhead and adjustable printing parameters. The look-up table can be stored and used for parameter mapping if needed.

The term "material property" refers to properties of the ink and/or properties of the spectacle lens substrate and its surface, respectively. Examples for material properties of the ink are: static and dynamic viscosity, static and dynamic surface tension, charge, etc. Examples for material properties of the spectacle lens substrate and its surface are: surface hydrophobicity, surface charge, surface treatment, surface functionality, etc.

The term "non-adjustable ink property" refers to a property of the ink that cannot be adjusted by the user, e.g., the chemical composition of the ink.

The term "non-transitory computer-readable storage medium" refers to a storage medium for permanent data storage, i.e., data is stored even without electricity. Examples include flash memory, read-only memory, ferroelectric random-access memory, most types of magnetic computer storage devices, e.g., hard disk drives, floppy disks, and magnetic tape, and optical discs.

The term "norm value" refers to a printing parameter describing multiplication variable factor by which the voltage applied to a certain printing nozzle is adjusted. The adjustment of the norm value is used to calibrate the firing signal of the printhead. The norm value can be regarded as a variable factor that quantifies the change in the firing voltage for each nozzle.

The term "optimizing" refers to a process whose aim is reaching an optimum of one or more properties. For example, optimizing a parameter map means that the parameter map is improved with regard to a certain property or target value.

The term "pattern" refers to one or more macroscopic elements, for example a number, a letter of any type of graphic, a graphic representation such as a dot, symbol etc.

The term "parameter" refers to a variable describing a certain property of an object or a method, e.g., temperature, distance, jetting frequency etc. Each parameter exhibits a certain "parameter value" which either can be constant or may vary, e.g., 25° C., 10 mm, 20 kHz etc.

The term "parameter map" refers to an assignment of distinct printing parameter values (e.g., P(x,y,z)) to a specific group of points (x,y,z) on the surface of the spectacle lens substrate. These groups of points can be defined by having similar "cost values" as determined from a cost function and surface geometry as input. The parameter map may be unique for each surface. The process for obtaining such a parameter map is referred to as parameter mapping. For example, the use of these specific groups of points to separate an image into, e.g., 8 sub-pictures that are printed with 8 different sets of printing parameter values P can be understood as parameter mapping.

The term "pose" is understood to mean the combination of the position and orientation of the named objects or components, e.g., the spectacle lens substrate or printhead, or reference axes in three-dimensional space, see also ISO 8373:2021-11, section 5.5. According to this, the position of a point mass in relation to a Cartesian coordinate system is defined by the distances along the coordinate directions x, y, z. If one spans a second Cartesian coordinate system at this mass point, the orientation of this coordinate cross is defined by the angular offset of its coordinate axes in relation to the corresponding axes of the base coordinate system. Three additional angles are necessary to describe the position of the new coordinate system with respect to the base coordinate system.

The term "printhead" refers to a part of the inkjet printing device bearing the printing nozzles, typically in one single component. The printhead may allow a complete coverage of the surface to be printed on, i.e., the whole surface to be printed on can be printed within a single printing pass using a single printhead.

The term "printing nozzle" refers to a nozzle of an inkjet printing device. A plurality of printing nozzles is arranged on the printhead of the inkjet printing device. During the jetting process of the ink, the printing nozzle is filled with and emptied off ink by making use of shockwaves stemming from piezoelectric actuation. Thus, a certain voltage profile is applied to the printing nozzle.

The term "printing nozzle group" refers to one or more printing nozzles that are commonly controlled using the same printing parameter values. One printing nozzle group may cover only a part of the surface to be printed on within a single printing pass, i.e., printing nozzles of at least two printing nozzle groups may be needed to print on the whole surface to be printed.

The term "printing parameter" refers to a parameter of a printing process. A printing parameter is either an adjustable printing parameter, i.e., a printing parameter that can in principle be adjusted by the user such as the jetting frequency, ejection temperature, jetting duration, or a non-adjustable printing parameter, i.e., a printing parameter that cannot be adjusted by the user such as the geometry of the printhead, or the number of printing nozzles. Several printing parameters may be combined in a so-called gray level, i.e., instead of several printing parameters, the gray level can be regarded as a common printing parameter within this disclosure.

The term "printing parameter value" refers to a parameter value of a printing parameter.

The term "printing process" refers to an inkjet printing process using the drop-on-demand technology, i.e., a process for depositing ink droplets on the surface of a substrate. The printing process can be described by printing parameters and their respective printing parameter values.

The term "processor" refers to a functional unit that interprets and executes instructions in a computer. The processor may be part of a processing unit that is a functional unit which consists of one or more processors and their internal storages (ISO/IEC 2382:2015).

The term "quality parameter" refers to parameters describing the quality of an inkjet printing process, e.g., number of satellites, circularity of printed features etc.

The term "single printing pass" refers to a printing process wherein printing nozzles of the at least two printing nozzle groups are used to print the pattern on the surface of the spectacle lens substrate at the same time. In other words, the at least two printing nozzle groups are to be used within the same printing pass. One printing pass may correspond to one printing or image layer, i.e., the at least two printing nozzle groups can be used to print one single printing or image layer.

The term "spectacle lens" refers to an ophthalmic lens worn in front of, but not in contact with, the eyeball (ISO 13666:2019(E), section 3.5.2), where an ophthalmic lens is a lens intended to be used for purposes of measurement, correction and/or protection of the eye, or for changing its appearance (ISO 13666:2019(E), section 3.5.1).

The term "spectacle lens substrate" refers to a piece of optical material that is used during the manufacturing process of a spectacle lens, such as precursors of the finished spectacle lens as well as the finished lens (ISO 13666:2019 (E), section 3.8.9), itself. Precursors of the finished lens are for example lens blanks, wherein the term "lens blank" refers to a piece of optical material with one optically finished surface for the making of a lens (ISO 13666:2019 (E), section 3.8.1), or uncut finished lenses, wherein the term "uncut finished lens" describes a finished lens prior to edging (ISO 13666:2019(E), section 3.8.8).

A surface is called "spherical" if it is a part of an inside or outside surface of a sphere (ISO 13666:2019(E), section 3.4.1) so that its cross section is circular in each meridian.

The term "storage medium" refers to a functional unit into which data can be placed, in which they can be retained, and from which they can be retrieved (ISO/IEC 2382:2015).

The term "surface" refers to any layer of the three-dimensional spectacle lens substrate or the three-dimensional coated lens that is in direct contact with the environment. The surface can be regarded as its boundary. The surfaces of a spectacle lens substrate include its front surface (ISO 13666:2019(E), section 3.2.13), edge, and back surface (ISO 13666:2019(E), section 3.2.14). Examples of differently shaped surfaces (surface types) are, among others, freeform progressive surfaces, freeform single vision surfaces, power-variation surfaces, (a)spherical surfaces, cylindrical surfaces and (a)toroidal surfaces. However, the disclosure is not restricted to a certain surface type.

In the context of a spectacle lens the expression "front surface" is used for a surface of a spectacle lens which is intended to be fitted away from the eye (ISO 13666:2019(E), section 3.8.13). In the context of a lens blank, the expression "front surface" is used for a surface which will eventually become the front surface of a spectacle lens that is manufactured from the lens blank. The curvature of a section of the front surface of a lens blank which is used as a starting object from which a spectacle lens is manufactured may already resemble the curvature of the spectacle lens to be manufactured.

In the context of a spectacle lens the expression "back surface" is used for a surface of a spectacle lens intended to be fitted nearer to the eye (ISO 13666:2019(E), section 3.8.14). In the context of a lens blank, the expression "back surface" is used for a surface which will eventually become the back surface of a spectacle lens that is manufactured from the lens blank. The back surface of a semi-finished lens blank may be machined during the manufacturing process of a spectacle lens.

The term "velocity vector" refers to a geometric object that has a magnitude or length, respectively, and a direction and that describes the velocity of the movement of the spectacle lens substrate and the printhead relative to each other, possibly referring to a certain reference point.

The term "virtual representation of a device" refers to a digital representation (a so-called digital twin) of a device such as an implementation of a device having the respective structural design features and/or a numerical and/or analytical data set describing the design features (numerical and/or analytical representation). For example, such a data set may be stored in a memory of a computer or on a computer-readable (particularly non-transitory) storage medium. In addition, the data set may be retrievable from a data network like, for example, the internet or a local area network (LAN). A dataset resembling a representation of a device may include all sorts of features of the device, in particular, a description of the structural features, the materials of the units, etc. Such a description may include, for example, a mathematical description of the structural features of the device. The virtual representation can be in a coded or encrypted form. The virtual representation of the device may in addition or alternatively include computer-readable instructions for controlling one or more manufacturing machines of the device in order to produce a physical device having the respective features.

The term "wave form parameter" refers to a printing parameter describing the voltage profile applied to a printing nozzle, e.g., minimum voltage, maximum voltage, slope, duration of the voltage applied etc. Usually, the voltage profile is described by a plurality of wave form parameters. Within the context of the present disclosure, one or more wave form parameters can be adjusted.

The articles "a", "an", and "the" as used in this specification and the appended claims include plural referents unless expressly and unequivocally limited to one referent.

The term "and/or" as used herein, when used in a series of two or more elements, means that any of the listed elements may be used alone, or any combination of two or more of the listed elements may be used. For example, when describing the usage of methods A, B, and/or C, method A alone; B alone; C alone; A and B in combination; A and C in combination; B and C in combination; or A, B, and C in combination may be used.

In a first aspect, the disclosure provides a computer-implemented method for determining printing parameter values of an inkjet printing device for printing a pattern on a surface, especially a curved surface, of a spectacle lens substrate. The inkjet printing device includes a printhead with a plurality of printing nozzles.

According to the disclosure the method comprises the following method steps: grouping the plurality of printing nozzles into at least two printing nozzle groups and individually determining, e.g., computing, a printing parameter value for at least one adjustable printing parameter of each printing nozzle group. Typically, the at least two printing nozzle groups are to be used within a single printing pass.

The surface of the spectacle lens substrate may be a front surface or a back surface. Furthermore, it may be a spherical surface, an aspherical surface, a freeform surface, or any other surface type, e.g., one of the before mentioned. The type of surface of the front surface and the back surface may be identical or different from each other.

One printing nozzle group may comprise a single, i.e., only one, printing nozzle, several printing nozzles or a plurality of printing nozzles. The number of printing nozzle groups may vary—from at least two printing nozzle groups to a number of printing nozzle groups being equal to the number of printing nozzles, i.e., each printing nozzle group may only comprise a single printing nozzle. The lower the number of printing nozzle groups the easier is the determination and possibly optimization of the corresponding printing parameter values. With increasing number of printing nozzle groups the printing parameter values can be better adapted to the surface of the spectacle lens substrate and better printing results may be obtained.

One basic idea of the present disclosure is based on the finding that by optimizing the printing parameter values individually for a group of printing nozzles or even for each individual printing nozzle, the overall printing quality that can be measured by parameters like dot shape and impact area could vastly be improved. In particular, the printing parameter values can be individually determined and optimized for different relative positions between the printhead and the spectacle lens substrate. Other or additional influencing factors that may influence the printing result, e.g., an anisotropic surface structuring or surface hydrophobicity, can be considered as well.

Moreover, the suggested method allows for obtaining an improved printed pattern within a single printing pass. In other words, it is not necessary to print different layers which saves time and productions costs. Furthermore, only one printhead is needed which saves time and productions costs even further. A hardware arrangement for moving the spectacle lens substrate and/or the printhead can be omitted.

The suggested method can be employed for any process in which surfaces of spectacle lens substrates are either built-up, coated and/or surface/in-material modified making use of inkjet printing technology, for example tinting using coating or diffusion procedures, permanent or temporary lens marking, masking layers, adhesive layer spots, additive manufacturing etc. The procedure is of particular interest for the processing of spectacle lens substrates for which the printing results can be optimized "by software", i.e., by the inventive computer-implemented method, instead of introducing complex positioning systems or robots to compensate for average settings of the printing parameters. As the surfaces of spectacle lens substrates are usually uniquely shaped, for example due to customized requirements, the proposed method enables fast printing with a high printing quality and low equipment expenditure. The described method extends the range of spectacle lens substrates that can be printed on with a high quality and therefore enables the use of inkjet printing technology for further applications within the production of spectacle lenses.

The at least one adjustable printing parameter can be selected from the group consisting of ejection temperature, jetting duration, jetting frequency, norm value, a wave form parameter, and an adjustable ink property. Typically, printing parameter values for more than one printing parameter can be individually, i.e., for each printing nozzle group, determined. The lower the number of printing parameters taken into account and respective printing parameter values to be determined the easier is their determination and possible optimization. With increasing number of printing parameter values to be determined the printing process can be better adapted to the surface of the spectacle lens substrate and better printing results may be obtained.

For example, controlling the jetting frequency sets the arrival interval, i.e., duration between neighboring droplets. For high jetting frequencies, the arrival interval between neighboring droplets is smaller than the solidification time of the droplets. In contrast, the arrival interval between neighboring droplets at low jetting frequencies is larger than the solidification time of droplets. This results in a lack of coalescence between adjacent droplets. Adapted printing parameter values based on geometric features of the spectacle lens substrate and the printhead result in higher printing quality with fewer satellites around the drop and less drop shape distortion.

In a specific development of the inventive method, the method may comprise obtaining input data concerning geometric features of the surface of the spectacle lens substrate and the printhead. Then, the printing parameter value can individually be determined depending on the input data, i.e., the geometric features of the surface of the spectacle lens substrate and the printhead. Analyzing the geometric features, especially the surface curvature, of the surface of the spectacle lens substrate to be printed on and the printhead allows for deriving the geometric relationship between the spectacle lens substrate and the printhead during a printing process. In other words, the input data can be used to determine a geometric relationship between the surface of the spectacle lens substrate and the printhead wherein the geometric relationship is described by at least one parameter selected from the group consisting of displacement vector, velocity vector, incident angle $\alpha$, distance, or arc length s. At least one, typically more than one or even all, of the parameters describing the geometric relationship can be selected and used for the individual determination of the printing parameter value(s).

Considering this geometric relationship, for each of the printhead's nozzles or nozzle groups, individual finely grained and optimized printing parameter values for at least one printing parameter can be determined, e.g., computed. In other words, the printing parameter values can be determined with respect to the geometric features which allows for improving the printing quality on curved surfaces by individually controlling each printing nozzle group. Complex positioning systems or robots to compensate for average settings of the printing parameters by positioning the spectacle lens substrate and the printhead relative to each other are not needed. Furthermore, the use of printheads with a non-planar surface, i.e., plane in which the printing nozzles are arranged, may be facilitated.

The input data can be obtained, for example, by receiving it from a storage unit for storing geometric features of different spectacle lens substrates and/or printheads by wired or wireless transfer. Other possibilities are a manual or automated input of geometric features using an input unit coupled to a data processing system carrying out the inventive method. The geometric features can be provided e.g., in the form of tabulated values or the geometric features can be measured and processed directly using a suitable measuring system. Combinations thereof are possible as well.

Apart from geometric features of the spectacle lens substrate and the printhead, the input data may comprise data concerning an environmental condition, a non-adjustable ink property and/or a material property of the spectacle lens substrate.

Considering these additional influencing factors when determining the printing parameter values can even better adopt the printing process to the overall conditions and improve the printing results further. For example, these additional influencing factors can be taken into account when deducing the at least one parameter map as described below, i.e., the parameter map does not only describe the geometric relationship between the spectacle lens substrate and the printhead during a printing process but also includes further influencing factors that may possibly influence the printing process.

In a further specific development of the inventive method, the method step of individually determining the printing parameter value for the at least one adjustable printing parameter may include deducing a parameter map comprising an assignment of printing parameter values to a specific group of points on the surface of the spectacle lens substrate.

For deducing the parameter map, the known geometric features, e.g., as part of the input data, describing the surface of the spectacle lens substrate, such as the true front curve radius, can be used to convert the surface into a grid or mesh of data points. Then, it can be looped through these data points and looked for working settings, i.e., a set of printing parameter values, in a universal look-up table created in advance. The look-up table may comprise optimized printing parameter values for certain data points and a certain printhead, i.e., a certain geometric relationship between a spectacle lens substrate and a printhead. One and the same data point stored in this look-up table can be present on many different surfaces.

The deduced parameter maps may form the basic reference system to optimize the complete printing parameter space, e.g., optimize the dot shape of ink droplets or weight as a function of incident angle, nozzle-substrate distance, velocity vector of the printhead, jetting frequency and jetting duration.

For example, the parameter map may be deduced by optimizing a cost function applied to a correlation of parameters describing the geometric relationship between the surface of the spectacle lens substrate and the printhead with printing parameter values for the adjustable printing parameters, e.g., a correlation stored in a look-up table.

The optimization of the cost function can be done by using at least one method selected from the group consisting of steepest gradient decent, genetic algorithms and machine learning. For example, a so-called Broyden-Fletcher-Goldfarb-Shanno algorithm can be used for the optimization.

Furthermore, machine learning processes can be used for the optimization. This might enable the detection and consideration of further influencing factors whose influence is currently not considered.

In a further specific development of the inventive method, the printing parameter value for the at least one adjustable printing parameter of each printing nozzle group can be individually determined such that the tilt angle of the printhead relative to the surface of the spectacle lens substrate does not have to be adjusted prior to printing and/or during printing.

For example, the surface to be printed and the surface of the printhead comprising the printing nozzles may be essentially orientated in parallel throughout the printing process.

This avoids a complicated hardware arrangement for rotating, for example mechanically tilting, the spectacle lens substrate and/or the printhead before and/or during printing that is otherwise needed to optimize the printing result. The effects realized by complicated hardware arrangements such as tilting equipment in the related art can be mimicked solely via fully individualized printing parameter values, i.e., individualized ejection profiles for the printing nozzle groups.

Depending on the size of the printhead and the surface to be printed, i.e., in case the size of the printhead allows for covering the whole surface to be printed, the pose, i.e., position and orientation, of both the spectacle lens substrate and the printhead may even remain constant with respect to each other during the printing of the pattern on the surface of the spectacle lens substrate. In other words, the improved pattern can be obtained without moving the spectacle lens substrate and the printhead with respect to each other but only by adjusting the printing parameter value(s) of one or more adjustable printing parameters. This may allow for an even more simplified hardware arrangement.

According to a further aspect of the disclosure, a data processing system comprising a processor and a storage medium coupled to the processor is provided. The processor is adapted to determine printing parameter values of an inkjet printing device including a printhead with a plurality of printing nozzles for printing a pattern on a surface of a spectacle lens substrate based on a computer program stored on the storage medium.

The processor is adapted to group the plurality of printing nozzles into at least two printing nozzle groups and individually determine a printing parameter value for at least one adjustable printing parameter of each printing nozzle group. Typically, the at least two printing nozzle groups are to be used within a single printing pass.

In other words, the data processing system is configured to carry out one of the computer-implemented methods for determining printing parameter values of an inkjet printing device for printing a pattern on a surface of a spectacle lens substrate as described above. Hence, reference is made to the above explanations describing the computer-implemented method for determining printing parameter values of an inkjet printing device for printing a pattern on a surface of a spectacle lens substrate and its advantages.

In a specific development, the processor is adapted to individually determine the printing parameter value depending on geometric features of the spectacle lens substrate and the printhead.

According to a further aspect of the disclosure, a computer program comprising instructions which, when the program is executed by a computer, cause the computer to determine printing parameter values of an inkjet printing device for printing a pattern on a surface of a spectacle lens substrate, the inkjet printing device including a printhead with a plurality of printing nozzles, is provided. The instructions cause the computer to group the plurality of printing nozzles into at least two printing nozzle groups and individually determine a printing parameter value for at least one adjustable printing parameter of each printing nozzle group. Typically, the at least two printing nozzle groups are to be used within a single printing pass.

In other words, the computer program comprises instructions for carrying out one of the computer-implemented methods for determining printing parameter values of an inkjet printing device for printing a pattern on a surface of a spectacle lens substrate as described above. Hence, reference is made to the above explanations describing the computer-implemented method for determining printing parameter values of an inkjet printing device for printing a pattern on a surface of a spectacle lens substrate and its advantages.

According to a further aspect of the disclosure, a non-transitory computer-readable storage medium comprising instructions which, when executed by a computer, cause the computer to determine printing parameter values of an inkjet printing device for printing a pattern on a surface of a spectacle lens substrate, the inkjet printing device including a printhead with a plurality of printing nozzles, is provided. The instructions cause the computer to group the plurality of printing nozzles into at least two printing nozzle groups and individually determine a printing parameter value for at least one adjustable printing parameter of each printing nozzle group. Typically, the at least two printing nozzle groups are to be used within a single printing pass.

In other words, the non-transitory computer-readable storage medium comprises instructions for carrying out one of the computer-implemented methods for determining printing parameter values of an inkjet printing device for printing a pattern on a surface of a spectacle lens substrate as described above. Hence, reference is made to the above explanations describing the computer-implemented method for determining printing parameter values of an inkjet printing device for printing a pattern on a surface of a spectacle lens substrate and its advantages.

According to a further aspect of the disclosure, a method for inkjet printing is provided, wherein a pattern is printed on a surface of a spectacle lens substrate with an inkjet printing device including a printhead with a plurality of printing nozzles using a printing parameter value for at least one adjustable printing parameter. The printing parameter value for the at least one adjustable printing parameter is determined according to a computer-implemented method as described above.

In other words, after determining the printing parameter values for the at least one adjustable printing parameter by the computer-implemented method for determining printing parameter values of an inkjet printing device for printing a pattern on a surface of a spectacle lens substrate, the inkjet printing device including a printhead with a plurality of printing nozzles, wherein the method comprises: grouping the plurality of printing nozzles into printing nozzle groups, and individually determining a printing parameter value for at least one adjustable printing parameter of each printing nozzle group the actual printing using the determined printing parameter values can be carried out. Hence, reference is made to the above explanations describing the computer-implemented method for determining printing parameter values of an inkjet printing device for printing a pattern on a surface of a spectacle lens substrate and its advantages. The inkjet printing method can, for example, be used for tinting using coating or diffusion procedures, permanent or temporary lens marking, masking layers, adhesive layer spots, e.g., to increase the surface roughness for coating applications, additive manufacturing etc.

In a specific development of the inkjet printing method, a tilt angle of the printhead relative to the surface of the spectacle lens substrate is not adjusted prior to printing and/or during printing.

For example, the surface to be printed and the surface of the printhead comprising the printing nozzles may be essentially orientated in parallel throughout the printing process.

This avoids a complicated hardware arrangement for rotating, for example mechanically tilting, the spectacle lens substrate and/or the printhead before and/or during printing that is otherwise needed to optimize the printing result. The effects realized by complicated hardware arrangements such as tilting equipment in the related art can be mimicked solely via fully individualized printing parameter values, i.e., individualized ejection profiles for the printing nozzle groups.

Depending on the size of the printhead and the surface to be printed, i.e., in case the size of the printhead allows for covering the whole surface to be printed, the pose, i.e., position and orientation, of both the spectacle lens substrate and the printhead may even remain constant with respect to each other during the printing of the pattern on the surface of the spectacle lens substrate. In other words, the improved pattern can be obtained without moving the spectacle lens substrate and the printhead with respect to each other but only by adjusting the printing parameter value(s) of one or more adjustable printing parameters. This may allow for an even more simplified hardware arrangement. According to a further aspect of the disclosure, an inkjet printing device for printing a pattern on a surface of a spectacle lens substrate is provided. The inkjet printing device includes a printhead with a plurality of printing nozzles, and a data processing system comprising a processor and a storage medium coupled to the processor, wherein the processor is adapted to determine printing parameter values based on a computer program stored on the storage medium. The processor is adapted to group the plurality of printing nozzles into at least two printing nozzle groups and individually determine a printing parameter value for at least one adjustable printing parameter of each printing nozzle group. Typically, the at least two printing nozzle groups are to be used within a single printing pass.

The inkjet printing device is configured to carry out the method for inkjet printing as described above. Hence, reference is made to the above explanations describing the method for inkjet printing, wherein a pattern is printed on a surface of a spectacle lens substrate, and its advantages.

According to a further aspect of the disclosure, a data set data set in the form of a computer-readable data signal comprising at least one kind of the following kinds of data: (i) a virtual representation of the inkjet printing device as described above configured to be fed to one or more manufacturing machines for manufacturing the device or (ii) data containing computer-readable instructions for controlling one or more manufacturing machines to manufacture the inkjet printing device as described above is provided.

According to a further aspect of the disclosure, a data set in the form of a computer-readable data carrier signal is provided. The data set comprise at least one kind of the following kinds of data: (i) printing parameter values for at least one adjustable printing parameter individual for at least two printing nozzle groups of an inkjet printing device including a printhead with a plurality of printing nozzles configured to be fed to the inkjet printing devices for printing a pattern on a surface of a spectacle lens substrate or (ii) data containing computer-readable instructions for controlling an inkjet printing device to print a pattern on a surface of a spectacle lens substrate by applying individual printing parameter values for at least one adjustable printing parameter to at least two printing nozzle groups of the inkjet printing device including a printhead with a plurality of printing nozzles.

The data set can be used for carrying out a method for inkjet printing as described above, i.e., a method wherein a pattern is printed on a surface of a spectacle lens substrate with an inkjet printing device including a printhead with a plurality of printing nozzles using a printing parameter value for at least one adjustable printing parameter.

The data can be obtained by carrying out a the computer-implemented method for determining printing parameter values of an inkjet printing device for printing a pattern on a surface of a spectacle lens substrate as described above. Hence, reference is made to the above explanations describing this method and its advantages.

According to a further aspect of the disclosure, a computer-implemented method for determining printing parameter values of an inkjet printing device for printing a pattern on a curved surface of a spectacle lens substrate, the inkjet printing device including a printhead with a plurality of printing nozzles is provided. The method comprises the following method steps obtaining input data concerning geometric features of the surface of the spectacle lens substrate and the printhead, wherein the input data is used to determine a geometric relationship between the surface of the spectacle lens substrate and the printhead, grouping the plurality of printing nozzles into at least two printing nozzle groups, and individually determining a printing parameter value for at least one adjustable printing parameter of each printing nozzle group depending on the geometric relationship. Typically, the at least two printing nozzle groups are to be used within a single printing pass.

The surface of the spectacle lens substrate may be a front surface or a back surface. Furthermore, it may be a spherical surface, an aspherical surface, a freeform surface, or any other surface type, e.g., one of the before mentioned. The type of surface of the front surface and the back surface may be identical or different from each other.

One printing nozzle group may comprise a single, i.e., only one, printing nozzle, several printing nozzles or a plurality of printing nozzles. The number of printing nozzle groups may vary from at least two printing nozzle groups to a number of printing nozzle groups being equal to the number of printing nozzles, i.e., each printing nozzle group may only comprise a single printing nozzle. The lower the number of printing nozzle groups the easier is the determination and possibly optimization of the corresponding printing parameter values. With increasing number of printing nozzle groups the printing parameter values can be better adapted to the surface of the spectacle lens substrate and better printing results may be obtained.

One basic idea of the present disclosure is based on the finding that by optimizing the printing parameter values individually for a group of printing nozzles or even for each individual printing nozzle, the overall printing quality that can be measured by parameters like dot shape and impact area could vastly be improved. In particular, the printing parameter values can be individually determined and optimized for different relative positions between the printhead and the spectacle lens substrate. Other or additional influencing factors that may influence the printing result, e.g., an anisotropic surface structuring or surface hydrophobicity, can be considered as well. Furthermore, the use of printheads with a non-planar surface, i.e., plane in which the printing nozzles are arranged, may be facilitated.

Moreover, the suggested method allows for obtaining an improved printed pattern within a single printing pass. In other words, it is not necessary to print different layers which saves time and productions costs. Furthermore, only one printhead is needed which saves time and productions costs even further. A hardware arrangement for moving the spectacle lens substrate and/or the printhead can be omitted.

The suggested method can be employed for any process in which surfaces of spectacle lens substrates are either built-up, coated and/or surface/in-material modified making use of inkjet printing technology, for example tinting using coating or diffusion procedures, permanent or temporary lens marking, masking layers, adhesive layer spots, additive manufacturing etc. The procedure is of particular interest for the processing of spectacle lens substrates for which the printing results can be optimized "by software", i.e., by the inventive computer-implemented method, instead of introducing complex positioning systems or robots to compensate for average settings of the printing parameters. As the surfaces of spectacle lens substrates are usually uniquely shaped, for example due to customized requirements, the proposed method enables fast printing with a high printing quality and low equipment expenditure. The described method extends the range of spectacle lens substrates that can be printed on with a high quality and therefore enables the use of inkjet printing technology for further applications within the production of spectacle lenses.

The at least one adjustable printing parameter can be selected from the group consisting of ejection temperature, jetting duration, jetting frequency, norm value, a wave form parameter, and an adjustable ink property. Typically, printing parameter values for more than one printing parameter can be individually, i.e., for each printing nozzle group, determined. The lower the number of printing parameters taken into account and respective printing parameter values to be determined the easier is their determination and possible optimization. With increasing number of printing parameter values to be determined the printing process can be better adapted to the surface of the spectacle lens substrate and better printing results may be obtained.

For example, controlling the jetting frequency sets the arrival interval, i.e., duration between neighboring droplets. For high jetting frequencies, the arrival interval between neighboring droplets is smaller than the solidification time of the droplets. In contrast, the arrival interval between neighboring droplets at low jetting frequencies is larger than the solidification time of droplets. This results in a lack of coalescence between adjacent droplets. Adapted printing parameter values based on geometric features of the spectacle lens substrate and the printhead result in higher printing quality with fewer satellites around the drop and less drop shape distortion.

Analyzing the geometric features, especially the surface curvature, of the surface of the spectacle lens substrate to be printed on and the printhead allows for deriving the geometric relationship between the spectacle lens substrate and the printhead during a printing process. In other words, the input data is used to determine a geometric relationship between the surface of the spectacle lens substrate and the printhead.

The geometric relationship may be described by at least one parameter selected from the group consisting of displacement vector, velocity vector, incident angle $\alpha$, distance $\Delta$, and arc length s. Thus, at least one of the parameters describing the geometric relationship may be used for individually determining the printing parameter value for the at least one adjustable printing parameter of each printing nozzle group. At least one, typically more than one or even all, of the parameters describing the geometric relationship can be selected and used for the individual determination of the printing parameter value(s).

Considering this geometric relationship, for each of the printhead's nozzles or nozzle groups, individual finely grained and optimized printing parameter values for at least one printing parameter can be determined, e.g., computed. In other words, the printing parameter values are determined with respect to the geometric features which allows for improving the printing quality on curved surfaces by individually controlling each printing nozzle group. Complex positioning systems or robots to compensate for average settings of the printing parameters by positioning the spectacle lens substrate and the printhead relative to each other are not needed.

The input data can be obtained, for example, by receiving it from a storage unit for storing geometric features of different spectacle lens substrates and/or printheads by wired or wireless transfer. Other possibilities are a manual or automated input of geometric features using an input unit coupled to a data processing system carrying out the inventive method. The geometric features can be provided e.g., in the form of tabulated values or the geometric features can be measured and processed directly using a suitable measuring system. Combinations thereof are possible as well.

Optionally, the input data may comprise data concerning an environmental condition, a non-adjustable ink property and/or a material property of the spectacle lens substrate. Accordingly, the printing parameter value for the at least one adjustable printing parameter of each printing nozzle group may be individually determined depending on the data concerning an environmental condition, a non-adjustable ink property and/or a material property of the spectacle lens substrate.

By considering these additional influencing factors when determining the printing parameter values can even better adopt the printing process to the overall conditions and improve the printing results further. For example, these additional influencing factors can be taken into account when deducing the at least one parameter map as described below, i.e., the parameter map does not only describe the geometric relationship between the spectacle lens substrate and the printhead during a printing process but also includes further influencing factors that may possibly influence the printing process.

In a specific development, the method step of individually determining the printing parameter value for the at least one adjustable printing parameter deducing a parameter map comprising an assignment of printing parameter values to a group of data points on the surface of the spectacle lens substrate. Deducing the parameter map may include converting the surface of the spectacle lens substrate into a grid of data points.

The method step of individually determining the printing parameter value for the at least one adjustable printing parameter may also include providing a look-up table comprising a correlation of the parameters describing the geometric relationship between the surface of the spectacle lens substrate and the printhead with printing parameter values for the adjustable printing parameters. Individually determining the printing parameter values may then include deriving a set of printing parameter values from the look-up table for the data points.

Optionally, the parameter map may be deduced by optimizing a cost function applied to the correlation of parameters describing the geometric relationship between the surface of the spectacle lens substrate and the printhead with printing parameter values for the adjustable printing parameters.

In other words, for each parameter describing the geometric relationship between the surface of the spectacle lens substrate and the printhead or a combination thereof a certain set of printing parameter values can be allocated. Input data concerning the environmental conditions and material properties may be taken into account when creating the look-up table. The look-up table may comprise optimized printing parameter values for certain data points and a certain printhead, i.e., a certain geometric relationship between a spectacle lens substrate and a printhead. One and the same data point stored in this look-up table can be present on many different surfaces.

For deducing the parameter map, the known geometric features, e.g., as part of the input data, describing the surface of the spectacle lens substrate, such as the true front curve radius, can be used to convert the surface into a grid or mesh of data points. Then, it can be looped through these data points and looked for working settings, i.e., a set of printing parameter values, in a universal look-up table created in advance.

The deduced parameter maps may form the basic reference system to optimize the complete printing parameter space, e.g., optimize the dot shape of ink droplets or weight as a function of incident angle, nozzle-substrate distance, velocity vector of the printhead, jetting frequency and jetting duration.

For example, the parameter map may be deduced by optimizing a cost function applied to a correlation of parameters describing the geometric relationship between the surface of the spectacle lens substrate and the printhead with printing parameter values for the adjustable printing parameters, e.g., a correlation stored in a look-up table.

The optimization of the cost function can be done by using at least one method selected from the group consisting of steepest gradient decent, genetic algorithms and machine learning. For example, a so-called Broyden-Fletcher-Goldfarb-Shanno algorithm can be used for the optimization.

Furthermore, machine learning processes can be used for the optimization. This might enable the detection and consideration of further influencing factors whose influence is currently not considered.

In a further specific development, the printing parameter value for the at least one adjustable printing parameter of each printing nozzle group may be individually determined such that a tilt angle of the printhead relative to the surface of the spectacle lens substrate does not have to be adjusted prior to printing and/or during printing.

For example, the surface to be printed and the surface of the printhead comprising the printing nozzles may be essentially orientated in parallel throughout the printing process.

This avoids a complicated hardware arrangement for rotating, for example mechanically tilting, the spectacle lens substrate and/or the printhead before and/or during printing that is otherwise needed to optimize the printing result. The effects realized by complicated hardware arrangements such as tilting equipment in the related art can be mimicked solely via fully individualized printing parameter values, i.e., individualized ejection profiles for the printing nozzle groups.

Depending on the size of the printhead and the surface to be printed, i.e., in case the size of the printhead allows for covering the whole surface to be printed, the pose, i.e., position and orientation, of both the spectacle lens substrate and the printhead may even remain constant with respect to each other during the printing of the pattern on the surface of the spectacle lens substrate. In other words, the improved pattern can be obtained without moving the spectacle lens substrate and the printhead with respect to each other but only by adjusting the printing parameter value(s) of one or more adjustable printing parameters. This may allow for an even more simplified hardware arrangement.

According to a further aspect of the disclosure, a data processing system comprising a processor and a storage medium coupled to the processor, wherein the processor is adapted to determine printing parameter values of an inkjet printing device for printing a pattern on a surface of a spectacle lens substrate, the inkjet printing device including a printhead with a plurality of printing nozzles, based on a computer program stored on the storage medium is provided.

The processor is adapted to group the plurality of printing nozzles into at least two printing nozzle groups and individually determine a printing parameter value for at least one adjustable printing parameter of each printing nozzle group depending on a geometric relationship between the surface of the spectacle lens substrate and the printhead, the geometric relationship being determined by using input data concerning geometric features of the surface of the spectacle lens substrate and the printhead. Typically, the at least two printing nozzle groups are to be used within a single printing pass.

In other words, the data processing system is configured to carry out one of the computer-implemented methods for determining printing parameter values of an inkjet printing device for printing a pattern on a surface of a spectacle lens substrate wherein the printing parameter values are individually determined depending on the geometric relationship between the surface of the spectacle lens substrate and the printhead as described above. Hence, reference is made to the above explanations describing this computer-implemented method for determining printing parameter values of an inkjet printing device for printing a pattern on a surface of a spectacle lens substrate and its advantages.

According to a further aspect of the disclosure, a computer program comprising instructions which, when the program is executed by a computer, cause the computer to determine printing parameter values of an inkjet printing device for printing a pattern on a surface of a spectacle lens substrate, the inkjet printing device including a printhead with a plurality of printing nozzles, is provided. The instructions cause the computer to group the plurality of printing nozzles into at least two printing nozzle groups and individually determine a printing parameter value for at least one adjustable printing parameter each printing nozzle group depending on a geometric relationship between the surface of the spectacle lens substrate and the printhead, the geometric relationship being determined by using input data concerning geometric features of the surface of the spectacle lens substrate and the printhead. Typically, the at least two printing nozzle groups are to be used within a single printing pass.

In other words, the computer program comprises instructions for carrying out one of the computer-implemented methods for determining printing parameter values of an inkjet printing device for printing a pattern on a surface of a spectacle lens substrate wherein the printing parameter values are individually determined depending on the geometric relationship between the surface of the spectacle lens substrate and the printhead as described above. Hence, reference is made to the above explanations describing this computer-implemented method for determining printing parameter values of an inkjet printing device for printing a pattern on a surface of a spectacle lens substrate and its advantages.

According to a further aspect of the disclosure, a non-transitory computer-readable storage medium comprising instructions which, when executed by a computer, cause the computer to determine printing parameter values of an inkjet printing device for printing a pattern on a surface of a spectacle lens substrate, the inkjet printing device including a printhead with a plurality of printing nozzles, is provided. The instructions cause the computer to group the plurality of printing nozzles into at least two printing nozzle groups and individually determine a printing parameter value for at least one adjustable printing parameter of each printing nozzle group depending on a geometric relationship between the surface of the spectacle lens substrate and the printhead, the geometric relationship being determined by using input data concerning geometric features of the surface of the spectacle lens substrate and the printhead. Typically, the at least two printing nozzle groups are to be used within a single printing pass.

In other words, the non-transitory computer-readable storage medium comprises instructions for carrying out one of the computer-implemented methods for determining printing parameter values of an inkjet printing device for printing a pattern on a surface of a spectacle lens substrate wherein the printing parameter values are individually determined depending on the geometric relationship between the surface of the spectacle lens substrate and the printhead as described above. Hence, reference is made to the above explanations describing this computer-implemented method for determining printing parameter values of an inkjet printing device for printing a pattern on a surface of a spectacle lens substrate and its advantages.

According to a further aspect of the disclosure, a method for inkjet printing is provided, wherein a pattern is printed on a surface of a spectacle lens substrate with an inkjet printing device including a printhead with a plurality of printing nozzles using a printing parameter value for at least one adjustable printing parameter. The printing parameter value for the at least one adjustable printing parameter is determined according to a computer-implemented method wherein the printing parameter values are individually determined depending on the geometric relationship between the surface of the spectacle lens substrate and the printhead as described above.

In other words, after determining the printing parameter values for the at least one adjustable printing parameter by the computer-implemented method for determining printing parameter values of an inkjet printing device for printing a pattern on a surface of a spectacle lens substrate, the inkjet printing device including a printhead with a plurality of printing nozzles, wherein the method comprises: grouping the plurality of printing nozzles into printing nozzle groups, and individually determining a printing parameter value for at least one adjustable printing parameter of each printing nozzle group depending on the geometric relationship between the surface of the spectacle lens substrate and the printhead the actual printing using the determined printing parameter values can be carried out. Hence, reference is made to the above explanations describing the computer-implemented method for determining printing parameter values of an inkjet printing device for printing a pattern on a surface of a spectacle lens substrate wherein the printing parameter values are individually determined depending on the geometric relationship between the surface of the spectacle lens substrate and the printhead and its advantages. The inkjet printing method can, for example, be used for tinting using coating or diffusion procedures, permanent or temporary lens marking, masking layers, adhesive layer spots, e.g., to increase the surface roughness for coating applications, additive manufacturing etc.

In a specific development of this inkjet printing method, a tilt angle of the printhead relative to the surface of the spectacle lens substrate is not adjusted prior to printing and/or during printing.

For example, the surface to be printed and the surface of the printhead comprising the printing nozzles may be essentially orientated in parallel throughout the printing process.

This avoids a complicated hardware arrangement for rotating, for example mechanically tilting, the spectacle lens substrate and/or the printhead before and/or during printing that is otherwise needed to optimize the printing result. The effects realized by complicated hardware arrangements such as tilting equipment in the related art can be mimicked solely via fully individualized printing parameter values, i.e., individualized ejection profiles for the printing nozzle groups.

Depending on the size of the printhead and the surface to be printed, i.e., in case the size of the printhead allows for covering the whole surface to be printed, the pose, i.e., position and orientation, of both the spectacle lens substrate and the printhead may even remain constant with respect to each other during the printing of the pattern on the surface of the spectacle lens substrate. In other words, the improved pattern can be obtained without moving the spectacle lens substrate and the printhead with respect to each other but only by adjusting the printing parameter value(s) of one or more adjustable printing parameters. This may allow for an even more simplified hardware arrangement.

According to a further aspect of the disclosure, an inkjet printing device for printing a pattern on a surface of a spectacle lens substrate is provided. The inkjet printing device includes a printhead with a plurality of printing nozzles, and a data processing system comprising a processor and a storage medium coupled to the processor, wherein the processor is adapted to determine printing parameter values based on a computer program stored on the storage medium. The processor is adapted to group the plurality of printing nozzles into at least two printing nozzle groups and individually determine a printing parameter value for at least one adjustable printing parameter of each printing nozzle group depending on a geometric relationship between the surface of the spectacle lens substrate and the printhead, the geometric relationship being determined by using input data concerning geometric features of the surface of the spectacle lens substrate and the printhead. Typically, the at least two printing nozzle groups are to be used within a single printing pass.

The inkjet printing device is configured to carry out the method for inkjet printing as described above. Hence, reference is made to the above explanations describing the method for inkjet printing, wherein a pattern is printed on a surface of a spectacle lens substrate, and its advantages.

According to a further aspect of the disclosure, a data set in the form of a computer-readable data signal comprising at least one kind of the following kinds of data: (i) a virtual representation of the inkjet printing device as described above configured to be fed to one or more manufacturing machines for manufacturing the device or (ii) data containing computer-readable instructions for controlling one or more manufacturing machines to manufacture the inkjet printing device as described above is provided.

BRIEF DESCRIPTION OF THE DRAWINGS

Further features, properties and advantages of the present disclosure will become clear from the following description of exemplary embodiments in conjunction with the accompanying drawings.

FIG. 3 illustrates a typical voltage profile applied to the nozzle of an inkjet printhead according to the related art;

FIG. 4 schematically shows a surface of a spectacle lens substrate (half cut, side view);

DESCRIPTION OF EXEMPLARY EMBODIMENTS

Figure 1:
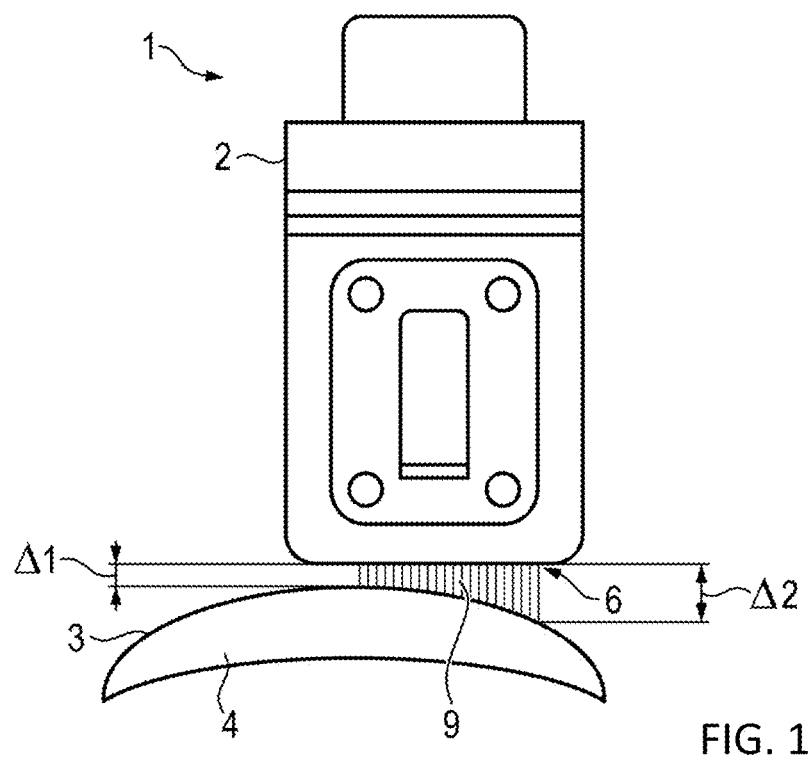
FIG. 1 schematically illustrates an inkjet printhead according to the related art moving over a curved surface of a spectacle lens substrate during the printing process.

FIG. 1 illustrates the technical problem underlying the present disclosure. A pattern is to be printed on the curved surface 3 of the spectacle lens substrate 4 using an inkjet printing device that includes a printhead 2 with a plurality of printing nozzles 6. The printing nozzles 6 eject droplets of ink 9 which are deposited on the surface 3 of the spectacle lens substrate 4.

Figure 2:
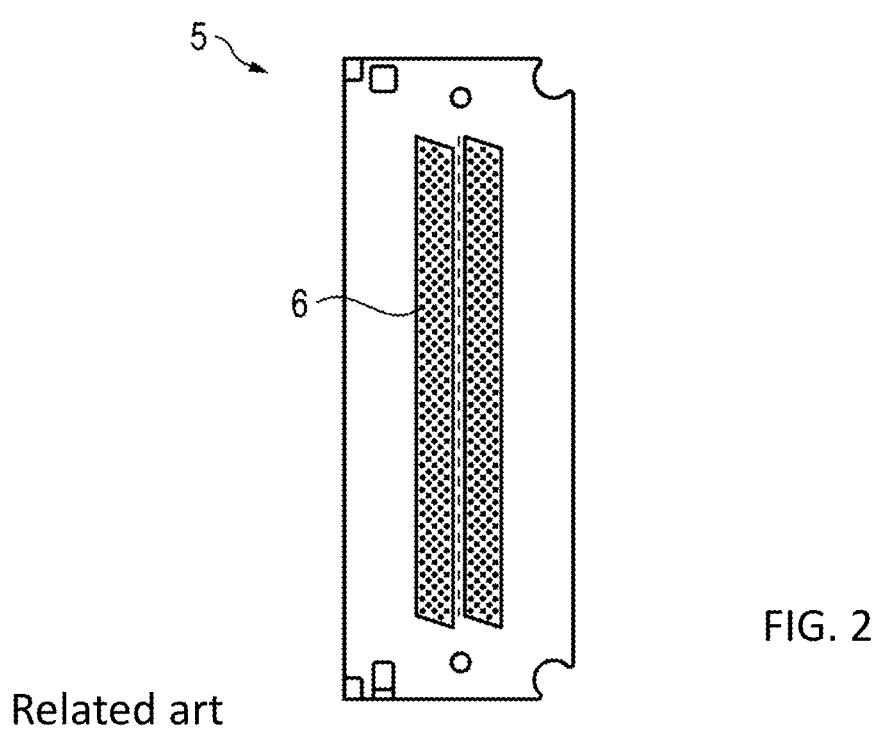
FIG. 2 shows a printhead with a plurality of printing nozzles in plan view from below according to the related art.

A typical printhead 2 as shown in FIG. 2 may comprise for example 880 printing nozzles 6 that are arranged in multiple columns and rows at a specific spacing. For example, 300 printing nozzles 6 may be arranged per inch in x direction yielding a printing resolution or pixel density, respectively, of 300 dots per inch (dpi).

According to the related art, all printing nozzles are uniformly controlled, i.e., the same printing parameter values 1 for the adjustable printing parameters 8 are used for all printing nozzles 6. This leads to a uniform print image as long as the surface 6 of the spectacle lens substrate 4 is uniform, e.g., flat. If, however, the surface 6 of the spectacle lens substrate 4 is not uniform, e.g., exhibits a curved surface 6 as shown in FIG. 1, the printing result is adversely affected. This is caused by different distances $\Delta_1$, $\Delta_2$ between the printing nozzles 6 and the surface 3 of the spectacle lens substrate 4. Typically, the minimum distance $\Delta_1$ between the printing nozzles 6 and the surface 3 of the spectacle lens substrate 4 is smaller than 5 mm. Its relative position-dependent value $\Delta_2$ varies and typically increases towards the outer part of the spectacle lens substrate 4.

FIG. 3 shows a typical voltage profile applied to the printing nozzles 6 during the printing process. Several phases, i.e., a quiescent phase, a pre-fill phase, an ejection phase and a re-fill/cancelation phase, can be distinguished. According to the related art, the same voltage profile is applied to all printing nozzles. To adapt the printing process and influence the overall printing quality, the voltage profile can be modified. For example, for each phase the minimum and maximum voltage, slope and/or duration can be modified. Printing parameters 8 adjustable by modifying the voltage profile are the jetting frequency, waveform and norm.

FIG. 4 depicts a curved surface 3 of a spectacle lens substrate 4 schematically in half cut side view: n is the normal vector of any point on the surface 3; j is the ejection vector at which the ejected ink is transferred from the printing nozzle 6 to the surface 3; $\alpha$ is the incident angle between the normal vector n and the ejection vector j; r is the true front curve (true radius of curvature) of the surface 3 when derived from a sphere; dx, dy (not shown in FIG. 4) and dz are discretized differences within the used coordinate system; s is the approximated arc length between two points on the surface 3.

Figure 5:
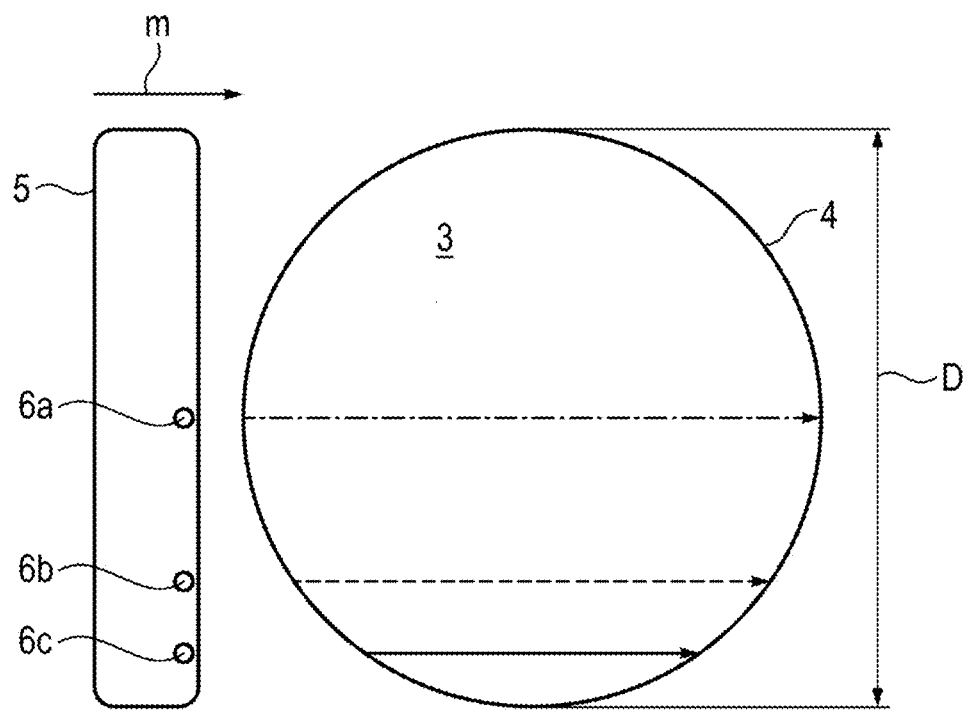
FIG. 5 schematically shows a printhead passing over the surface of a spectacle lens substrate (topview)

FIG. 5 depicts a surface 3 of a spectacle lens substrate 4 with the diameter D in top view with movement paths in x,y-direction of three different printing nozzles 6a, 6b, 6c of the printhead 5 during the printing process, i.e., if the printhead 5 and the surface 3 are moved linearly relative to each other along the moving direction m.

Figure 6:
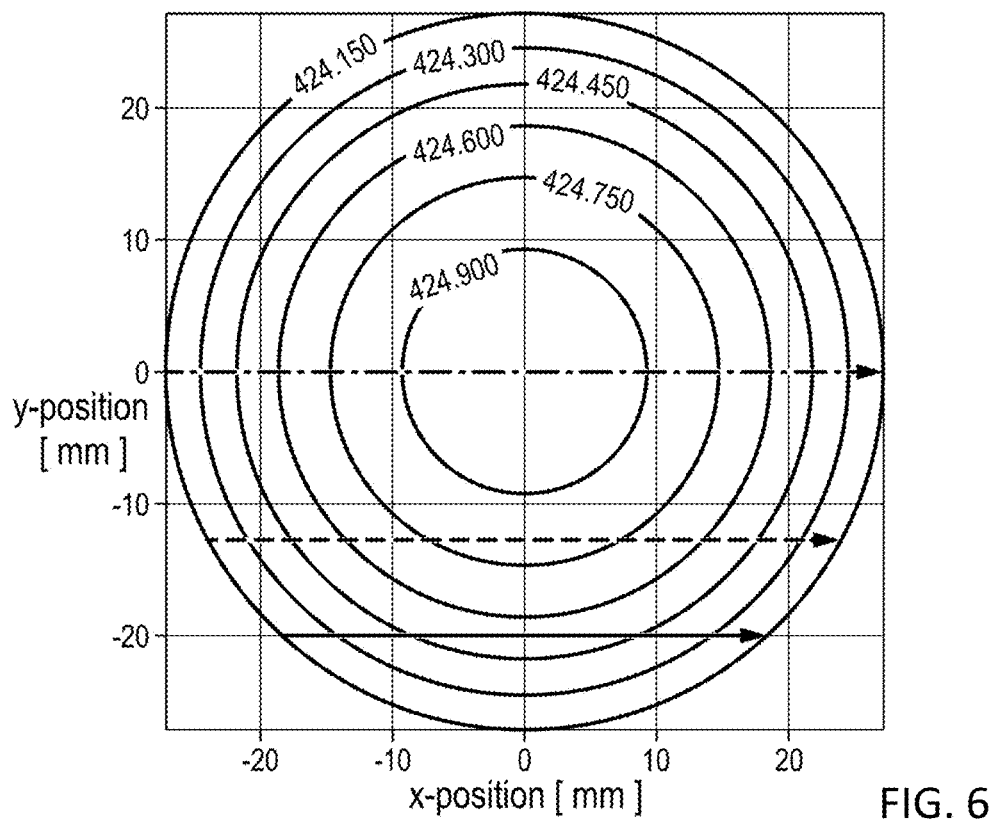
FIG. 6 shows discretized x,y,z positions of the points forming the front surface of a spectacle lens substrate with parameters D=50.0 mm, r=425.0 mm. The three arrows depict the x,y path of the three single printhead nozzles shown in FIG. 5 during the printing process.

Referring to FIGS. 6 to 9, the effects associated with printing on the exemplary surface 3 as shown in FIGS. 4 and 5 are explained further. The exemplary ejection vector j was chosen to be 0, 0, −1. FIG. 6 depicts discretized x,y,z positions of the points forming the front surface 3 of a spectacle lens substrate 4 with parameters D=50.0 mm, r=425.0 mm. The three arrows depict the x,y path of the three single printing nozzles 6a, 6b, 6c shown in FIG. 5 during the printing process. The z position is represented by the numbers ranging from 424.150 to 424.900 in FIG. 6. However, it is to be noted that the z position changes gradually which cannot be depicted in FIG. 6 due to required figure formalities. Hence, the annotated values for the z position are only exemplary to represent the general course of the z position.

Figure 7:
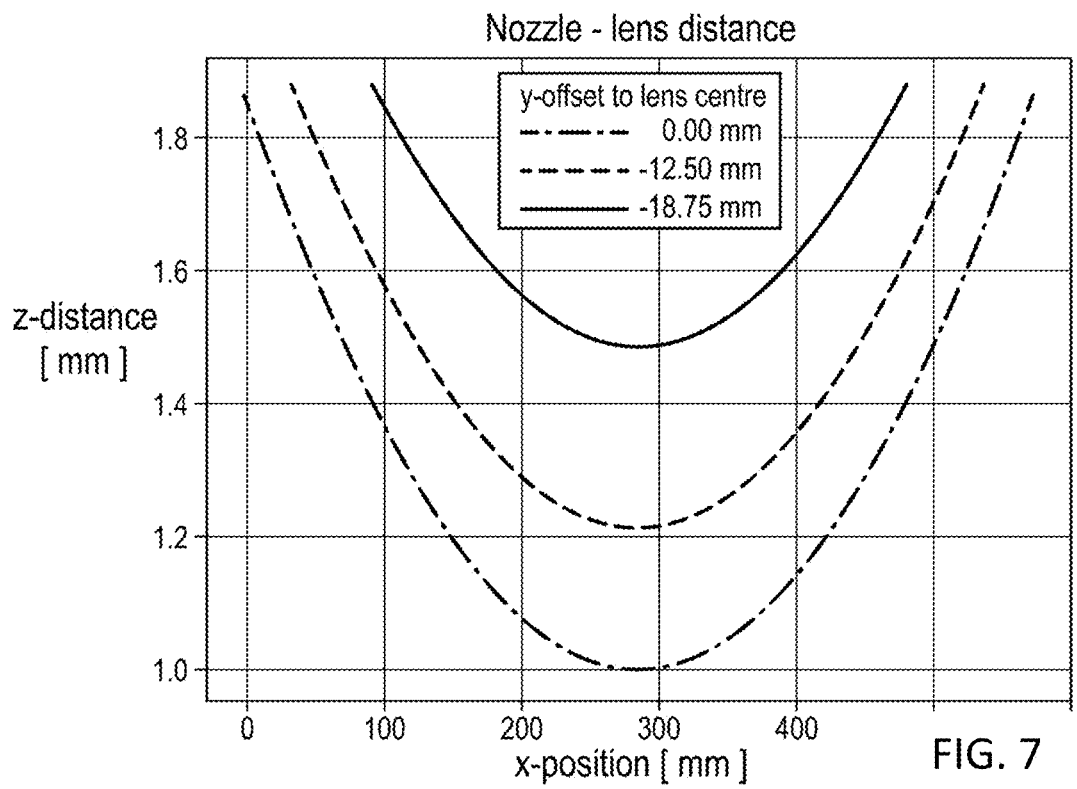
FIG. 7 shows the computed height-differences between the three printing nozzles shown in FIG. 5 and the surface of the spectacle lens substrate during the printing process.

FIG. 7 shows the corresponding computed height profiles between the printing nozzles 6a, 6b, 6c and the surface 3 during the printing process, i.e., the z position along the arrows in FIG. 6. The minimum distance $\Delta_1$ between the printing nozzles 6 and the surface 3 of the spectacle lens substrate 4 was 1 mm.

As can be seen from FIGS. 6 and 7, the height difference along the path of printing nozzle 6a is much larger than for printing nozzles 6b, 6c. This leads to inconsistent printing results, i.e., the overall printing quality is severely degraded towards the edges of the spectacle lens substrate 4 if optimized for the center of the surface 3.

Figure 8:
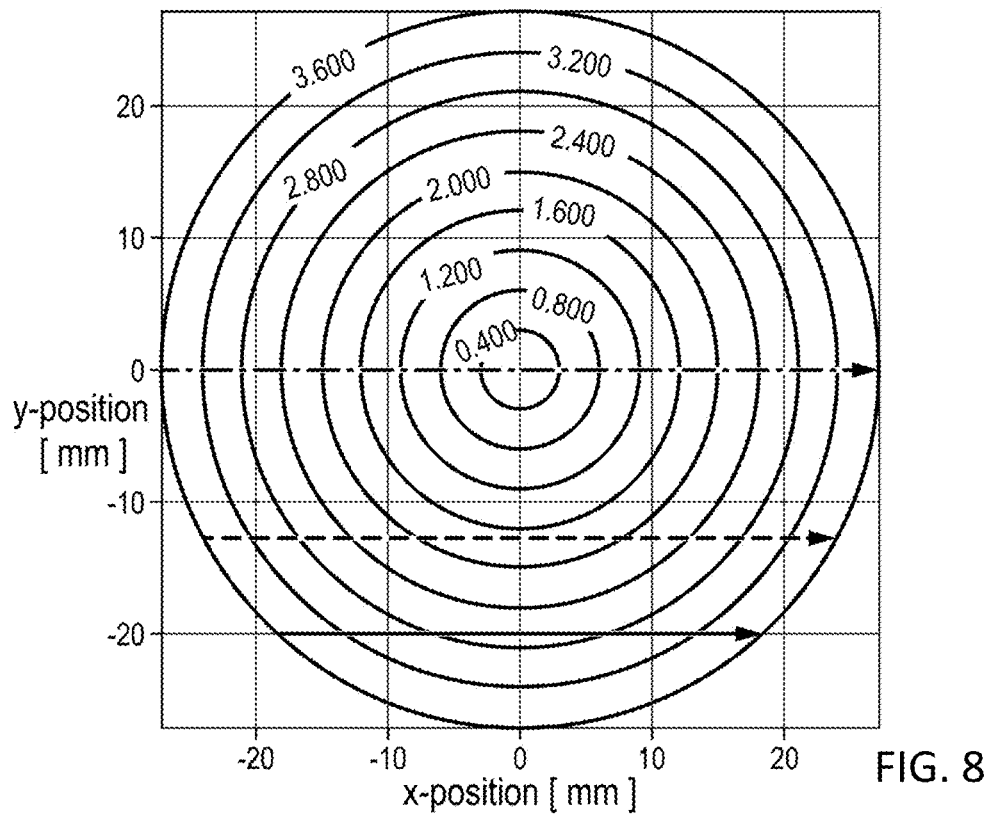
FIG. 8 shows the incident angle $\alpha(x, y, z)$ between the normal vectors $n(x,y,z)$ of the front surface of the spectacle lens substrate with parameters D=50.0 mm, r=425.0 mm and the incoming inkjet (0, 0, −1) of the three printing nozzles shown in FIG. 5.
Figure 9:
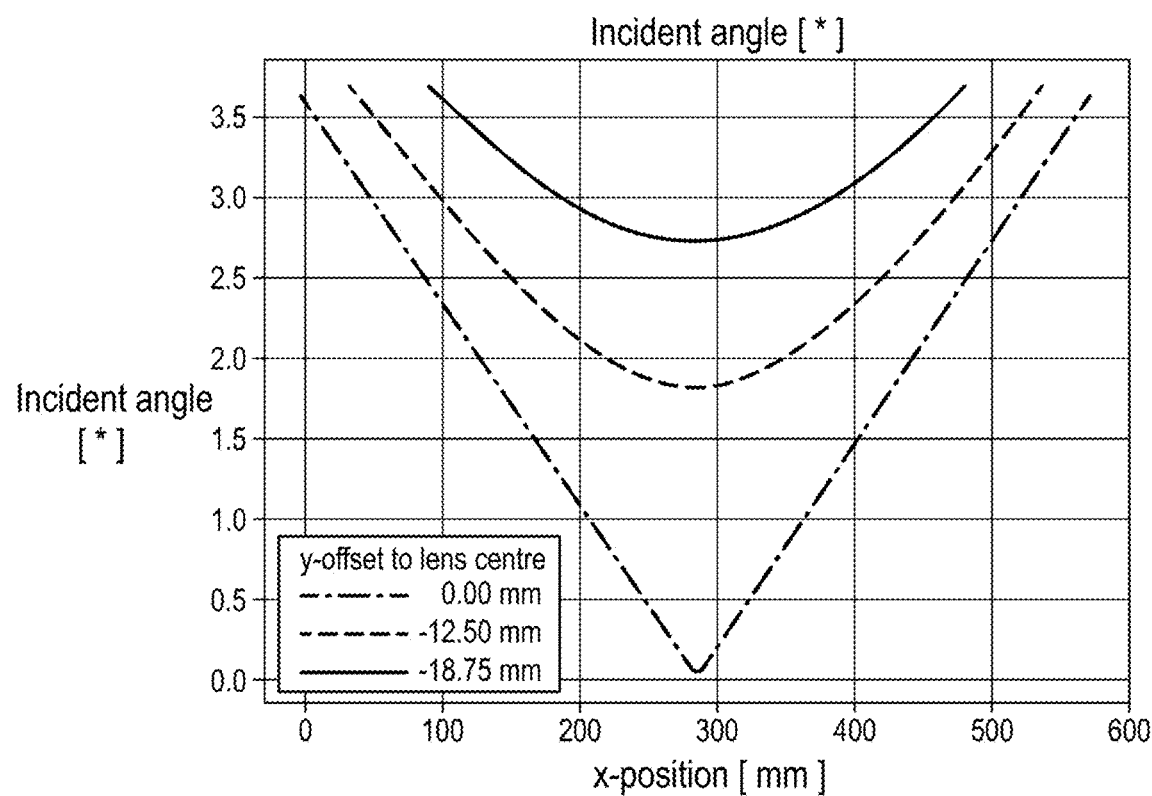
FIG. 9 shows the incident angles for the three printing nozzles along their path as shown in FIG. 5.

FIG. 8 depicts discretized x,y positions of the points forming the front surface 3 of a spectacle lens substrate 4 with parameters D=50.0 mm, r=425.0 mm. The three arrows depict the x,y path of the three single printing nozzles 6a, 6b, 6c shown in FIG. 5 during the printing process. The incident angle $\alpha$ for the different x, y positions is represented by numbers ranging from 0.400 to 3.600 in FIG. 8. However, it is to be noted that the incident angle $\alpha$ changes gradually which cannot be depicted in FIG. 8 due to required figure formalities. Hence, the annotated values for the incident angle $\alpha$ are only exemplary to represent the general course of the incident angle $\alpha$. FIG. 9 shows the incident angle $\alpha$ depending on the x position of the printing nozzles 6a, 6b, 6c, i.e., the incident angle $\alpha$ along the arrows in FIG. 8. The incident angle $\alpha$ varies between 0° and more than 3,5°, wherein the deviations are much larger for printing nozzle 6a compared to printing nozzles 6b, 6c. In general, the incident angle $\alpha$ increases towards the edges of the spectacle lens substrate 4. This amplifies the inconsistent printing results already caused due to the height differences as explained with respect to FIGS. 6 and 7, i.e., the overall printing quality is even more degraded towards the edges of the spectacle lens substrate 4 if optimized for the center of the surface 3.

With increasing distance $\Delta$ between the printing nozzles 6 and the surface 3 of the spectacle lens substrate 4 and increasing incident angle $\alpha$, a clear trend to scattered printing results, i.e., multiple small dots, could be observed by the inventors of the present disclosure.

Figure 10:
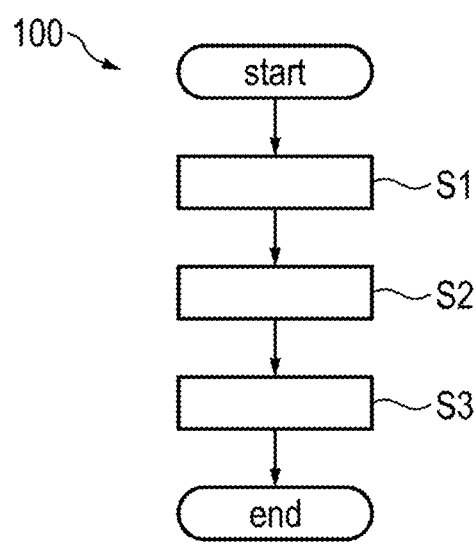
FIG. 10 is a flowchart illustrating an exemplary embodiment of a computer-implemented method for determining printing parameter values.

To reduce the effects that detrimentally effect the printing quality as explained above, a computer-implemented method 100 for determining printing parameter values 1 of an inkjet printing device 2 for printing a pattern on the surface 3 of a spectacle lens substrate 4 is proposed. The inkjet printing device 2 includes a printhead 5 with a plurality of printing nozzles 6. The flowchart depicted in FIG. 10 refers to a first exemplary embodiment of such a method 100.

In a first step S1, input data 8 concerning geometric features of the surface 3 of the spectacle lens substrate 4 and the printhead 5 of the inkjet printing device 2 are obtained. This data may comprise data about the topological shape of the surface 3 of the spectacle lens substrate 4, e.g., its diameter D, its true front curve r, and geometric data about the printhead 5, e.g., its orientation, number of printing nozzles 6, spacing of printing nozzles 6, etc. For example, the diameter D may be 50 mm and the true curve r 425.0 mm. The printhead 5 may comprise 880 printing nozzles 6 with a nozzle spacing of 300 per inch in x direction.

In step S2, the plurality of printing nozzles 6 are grouped into five printing nozzle groups 10a, 10b, 10c, 10d, 10e. The exact number of printing nozzle groups 10a, 10b, 10c, 10d, 10e may vary depending on the geometric features of the spectacle lens substrate 4 and/or the required printing quality. At least two of the five printing nozzle groups 10a, 10b, 10c, 10d, 10 are to be used within a single printing pass. Optionally, all five printing nozzle groups 10a, 10b, 10c, 10d, 10 are to be used within a single printing pass.

Figure 11:
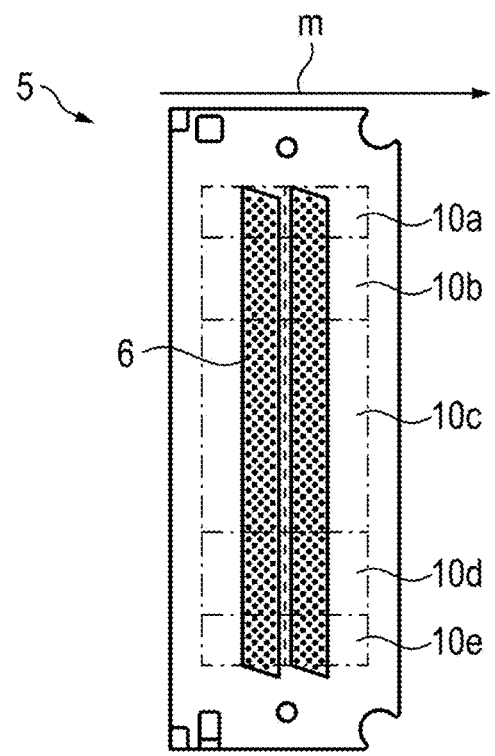
FIG. 11 schematically shows a printhead with printing nozzle groups.

FIG. 11 shows the printhead 5 with its printing nozzles 6 grouped into five printing nozzle groups 10a, 10b, 10c, 10d, 10e that are arranged symmetrically with respect to the moving direction m of the printhead 5. Towards the edges, two printing nozzle groups 10a, 10e are arranged which comprise the lowest number of printing nozzles 6. Further to the center, two printing nozzle groups 10b, 10d are arranged which comprise a higher number of printing nozzles 6. The central printing nozzle group 10c comprises the highest number of printing nozzles 6. This number of printing nozzle groups 10a, 10b, 10c, 10d, 10e and their arrangement result from courses of the height difference and the incident angle α as shown in FIGS. 7 and 9 that are steep towards the edges and more flat in the center.

Referring again to FIG. 10, in step S3, printing parameter values 1 for adjustable printing parameters 7 are individually determined for each printing nozzle group 10a, 10b, 10c, 10d, 10e. For example, printing parameter values 1 of one or more printing parameters 7 selected from the group of ejection temperature, jetting duration, jetting frequency, norm value, a wave form parameter, and an adjustable ink property can be determined for each printing nozzle group 10a, 10b, 10c, 10d, 10e.

Thereafter, a pattern can be printed on the surface 3 of the spectacle lens substrate 4 using the determined printing parameter values 1 for each printing nozzle group 10a, 10b, 10c, 10d, 10e. Optionally, the tilt angle of the printhead 5 relative to the surface 3 of the spectacle lens substrate 4 is not adjusted prior to printing and/or during printing.

Figure 12:
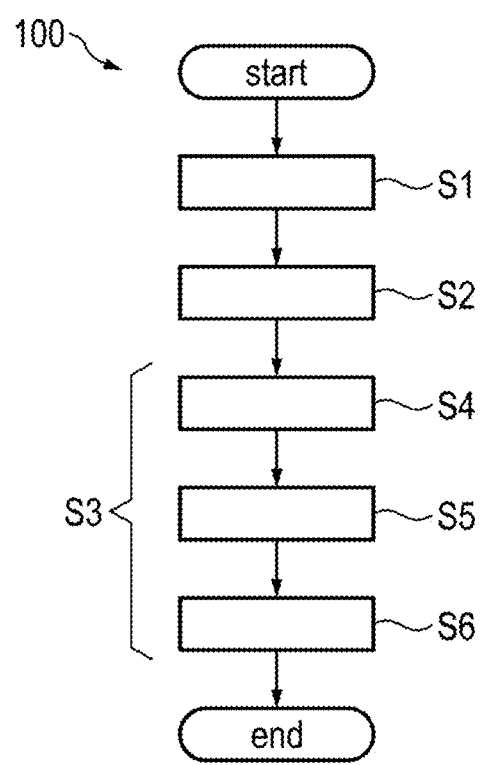
FIG. 12 is a flowchart illustrating a further exemplary embodiment of a computer-implemented method for determining printing parameter values.

FIG. 12 depicts a flowchart of a further exemplary embodiment of a computer-implemented method 100 for determining printing parameter values 1 of an inkjet printing device 2 for printing a pattern on the surface 3 of a spectacle lens substrate 4. Concerning steps S1 and S2, it is referred to the description of FIG. 10.

Step S3, i.e., the step of individually determining printing parameter values 1 for adjustable printing parameters 7, 7a, 7b, 7c, 7d, 7e, 7f for each printing nozzle group 10a, 10b, 10c, 10d, 10e, comprises sub-steps S4 to S6.

In step S4, a look-up table 13 and a cost function are provided. For example, the look-up table 13 may be retrieved from a storage medium. The look-up table 13 contains a correlation of parameters 11, 11a, 11b, 11c describing the geometric relationship between the surface 3 of the spectacle lens substrate 4 and the printhead 5 and adjustable printing parameters 7, 7a, 7b, 7c, 7d, 7e, 7f. The cost function may be a universal cost function or a cost function dedicated to the special use case, i.e., considering quality parameters relevant for the special use case.

In step S5, the cost function is applied to the look-up table 13 and optimized to retrieve suitable printing parameter values 1 corresponding to the input data 8, 8a, 8b, 8c, 8d. In other words, printing parameter values 1 leading to a minimum of total costs, for example lowest possible number of satellites as quality parameter, considering the whole surface 3 of the spectacle lens substrate 4 to be printed on are retrieved from the look-up table 13. The optimization of the cost function can be done by using at least one method selected from the group consisting of steepest gradient decent, genetic algorithms and machine learning.

In step S6, a parameter map 12 is deduced in consideration of the optimization result which comprises an assignment of printing parameter values 1 to a specific group of points on the surface 3 of the spectacle lens substrate 4. In other words, printing parameters values 1 are individually determined for each printing nozzle group 10a, 10b, 10c, 10d, 10e and stored as the parameter map 12.

Thereafter, a pattern can be printed on the surface 3 of the spectacle lens substrate 4 using the determined printing parameter values 1 for each printing nozzle group 10a, 10b, 10c, 10d, 10e, i.e., the parameter map 12. In case it is not possible to amend the printing parameter values 1 during one printing process, e.g., the gray level cannot be changed, the actual printing parameter value 1 and its distribution can be discretized, e.g., into four parts from 0 to the radius R, wherein instead of one image several subimages, e.g., four subimages, are printed with different printing parameter values, e.g., four "rings" which fit into each other.

Figure 13:
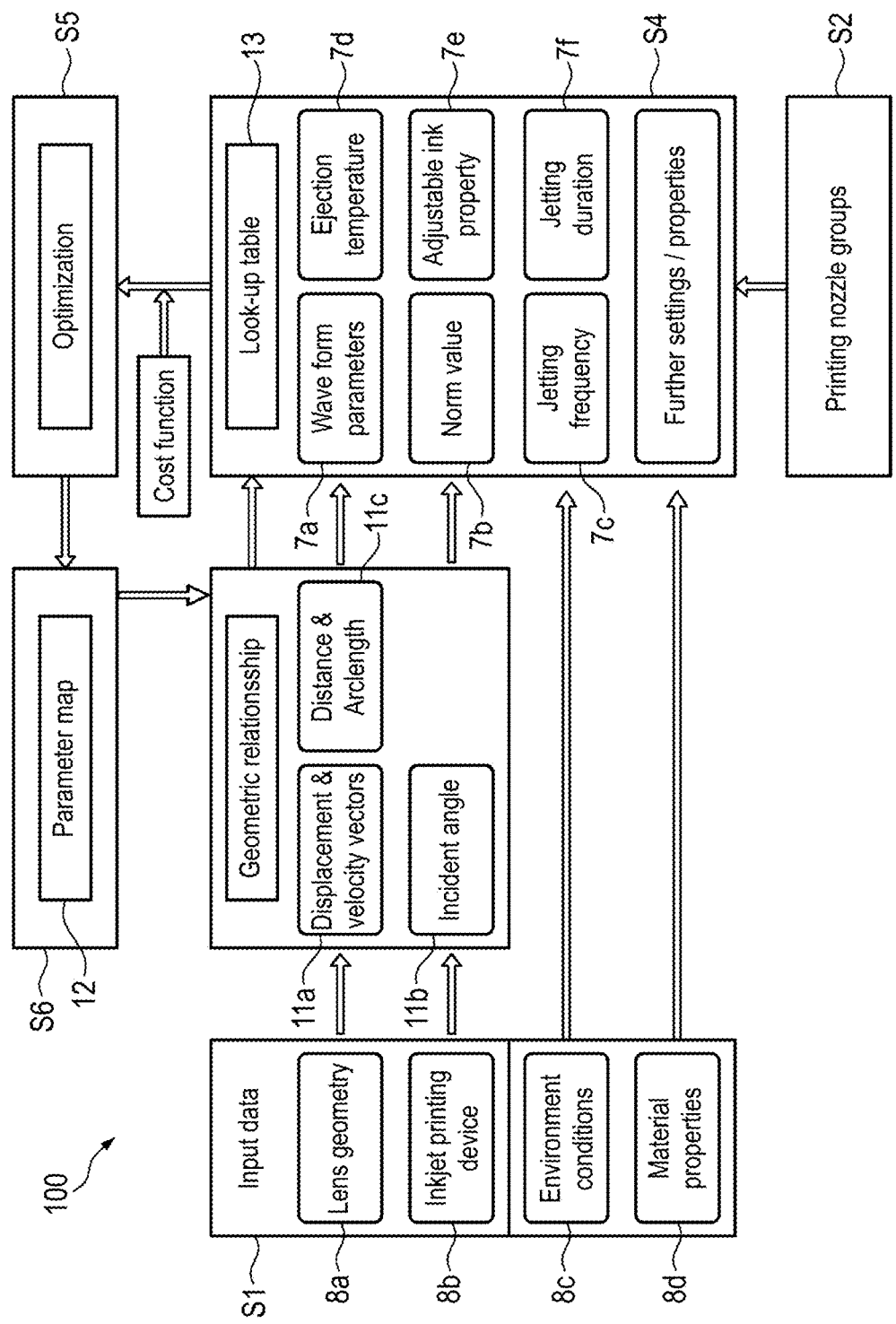
FIG. 13 shows a block diagram of a still further exemplary embodiment of a computer-implemented method for determining printing parameter values.

The block diagram shown in FIG. 13 illustrates a still further exemplary embodiment of a computer-implemented method 100 for determining printing parameter values 1 of an inkjet printing device 2 for printing a pattern on the surface 3 of a spectacle lens substrate 4.

The method 100 is based on the finding that each surface point of the surface 3 of the spectacle lens substrate 4 to print on should be accounted for individually by computing and applying optimized printing parameters 7a, 7b, 7c, 7d, 7e, 7f. The required input data 8a, 8b, 8c, 8d that is obtained in step S1 concerns geometric features of the surface 3 of the spectacle lens substrate 4, i.e., the lens geometry, and the printhead 5 as part of the inkjet printing device 2, and optionally, environmental conditions and material properties of the ink 9 and/or the spectacle lens substrate 4.

From this input data 8a, 8b, 8c, 8d parameter values for parameters 11a, 11b, 11c describing the geometric relationship between the surface 3 of the spectacle lens substrate 4 and the printhead 5 are deduced. They describe the system "inkjet printing device—spectacle lens substrate" during the printing process. Typical parameters 11a, 11b, 11c comprise, e.g., the incident angles α, displacement vectors, velocity vectors, distance Δ and arc length s.

In step S3, printing parameter values 1 for printing parameters 7a, 7b, 7c, 7d, 7e, 7f are computed for each printing nozzle group 10a, 10b, 10c, 10d, 10e that were created before in step S2. The printing parameters 7a, 7b, 7c, 7d, 7e, 7f taken into account in this exemplary embodiment are ejection temperature, jetting duration, jetting frequency, norm value, wave form parameters, and an adjustable ink property. Further settings and/or properties may be considered, too.

To retrieve the printing parameter values 1, a look-up table 13 is provided in step S4 which was created in advance and which comprises a correlation of parameters 11a, 11b, 11c describing the geometric relationship between the surface 3 of the spectacle lens substrate 4 and the printhead and printing parameter values 1 for the adjustable printing parameters 7a, 7b, 7c, 7d, 7e, 7f. The printing parameters 7a, 7b, 7c, 7d, 7e, 7f can be understood as a functional. For each parameter 11a, 11b, 11c describing the geometric relationship between the surface 3 of the spectacle lens substrate 4 and the printhead 5, or a combination thereof, a certain set of printing parameters 7a, 7b, 7c, 7d, 7e, 7f is allocated. Input data 8c, 8d concerning the environmental conditions and material properties may be taken into account when creating the look-up table 13.

Moreover, a cost function is provided which is applied to the look-up table 13 and optimized in step S5. Finally, a parameter map 12 is retrieved from the optimized cost function in step S6. The printing parameters 7a, 7b, 7c, 7d, 7e, 7f assigned to a specific group of points on the surface 3 of the spectacle lens substrate 4 are stored as the parameter map 12.

Figure 14:
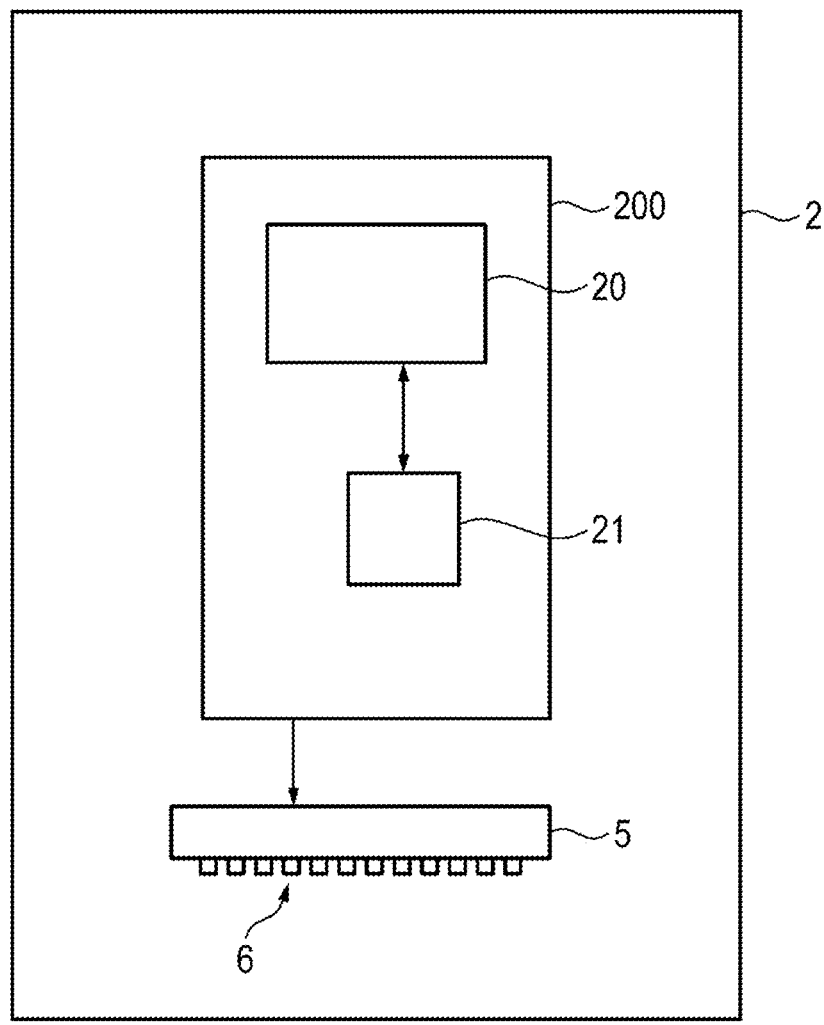
FIG. 14 schematically shows an exemplary embodiment of an inkjet printing device.

FIG. 14 depicts an exemplary embodiment of an inkjet printing device 2 using the drop-on-demand technology. The inkjet printing device 2 includes a printhead 5 with a plurality of printing nozzles 6. Moreover, the inkjet printing device 2 includes a data processing system 200 comprising a processor 20 and a storage medium 21 coupled to the processor 20, represented by the double arrow in FIG. 14. The processor 20 is adapted to group the plurality of printing nozzles 6 into at least two printing nozzle groups 10*a*, 10*b*, 10*c*, 10*d*, 10*e* and individually determine a printing parameter value 1 for at least one adjustable printing parameter 7, 7*a*, 7*b*, 7*c*, 7*d*, 7*e*, 7*f* of each printing nozzle group 10*a*, 10*b*, 10*c*, 10*d*, 10*e*, based on a computer program stored on the storage medium 21. The storage medium 21 may also be used for the storage of the look-up table 13 and/or retrieved parameter maps 12. In other words, the data processing system 200 may carry out one of the computer-implemented methods for determining printing parameter values 1 described herein. The determined printing parameter value 1 can be transmitted to the printhead 5 and its printing nozzles 6 for carrying out a printing process.

With reference to FIGS. 15 to 23, the creation of a look-up table 13 and the retrieval of a parameter map 12 are described in more detail below.

Within this exemplary embodiment, the hot-melt printing technology is used to print wax droplets in a distinct pattern on convex curved surfaces 3 of spectacle lens substrates 4. The surfaces 3 and the applied wax patterns are photographed using an industrial microscope. The images obtained for specific tiles of the printed wax patterns are analyzed with regards to the circularity of applied droplets and the number of formed satellites (small, spread and unwanted droplets). These properties can be quantified and are used as examples of printing quality parameters.

Using a Zeiss Recon system, overview-images of the whole surfaces 3 of the spectacle lens substrates 4 are obtained and the relative tile positions of the applied wax pattern are reconstructed from these images. Combining the gathered data from the microscope and the Recon system, the calculated quality parameter values are related to the position of the underlying tiles on the surface 3. This information is used to derive a look-up table 13 for suitable values for printing parameters 7, 7*a*, 7*b*, 7*c*, 7*d*, 7*e*, 7*f* to print on a surface 3 of a spectacle lens substrate 4.

The experimental steps include: hot-melt printing on surfaces 3 of spectacle lens substrates 4 (spit, no movement) using different settings for the norm value of the inkjet printing device 2, taking Recon images of the printed surfaces 3, analyzing the Recon images for tile positioning, taking microscope images of the different tiles of the applied pattern, defining quality parameters and analyzing microscope images, mapping quality parameters on surfaces 3, and running an optimizer to prepare lens-specific parameter maps 12.

Printing on Surfaces of Spectacle Lens Substrates

The printing is done using a Teco printer with a Xerox M1 printhead. From the technical data sheet of Xerox M1 print head series, the absolute and relative positions of single printing nozzles 6, 6*a*, 6*b*, 6*c* are known. Based on this information, an (x,y) array of individual nozzles is derived and used for the identification of single tiles during image analysis. In a standard printing process, it is known which printing nozzles 6, 6*a*, 6*b*, 6*c* pass over which parts of the surface 3 and the nozzle firing sequence is calculated accordingly.

First, a positioning system is used to position the spectacle lens substrates 4 to be printed on under the printhead 5. The "spitting" function of the printhead 5 is then used to apply the wax onto the surfaces 3 of the spectacle lens substrates 4. During "spitting", the spectacle lens substrates 4 are not moved. The formed pattern on the surfaces 3 correspond to the grid defined by the nozzle plate of the Xerox M1 printhead. In the experiments, five shots (repetition of wave forms—10 Hz, 500 ms) are fired each on a number of six spectacle lens substrates 4 with the same geometry and minimum distance to the printhead 5. Among these spectacle lens substrates 4 the printing parameter 7, 7*a*, 7*b*, 7*c*, 7*d*, 7*e*, 7*f* norm value is increased from 20 to 60 in a step size of 10.

Acquisition and Analysis of Recon Images

The relative and absolute position of the grid tiles on the surfaces 3 of the spectacle lens substrates 4 can be reconstructed from Recon images. The Zeiss Recon system is a system used to obtain high quality images of ophthalmic lenses for the detection of, e.g., laser engravings and similar structures. In this case, the Recon system is used to detect the (x,y) position of single wax droplets. Regarding software, OpenCV and Python were used to analyze the Recon images.

Figure 15:
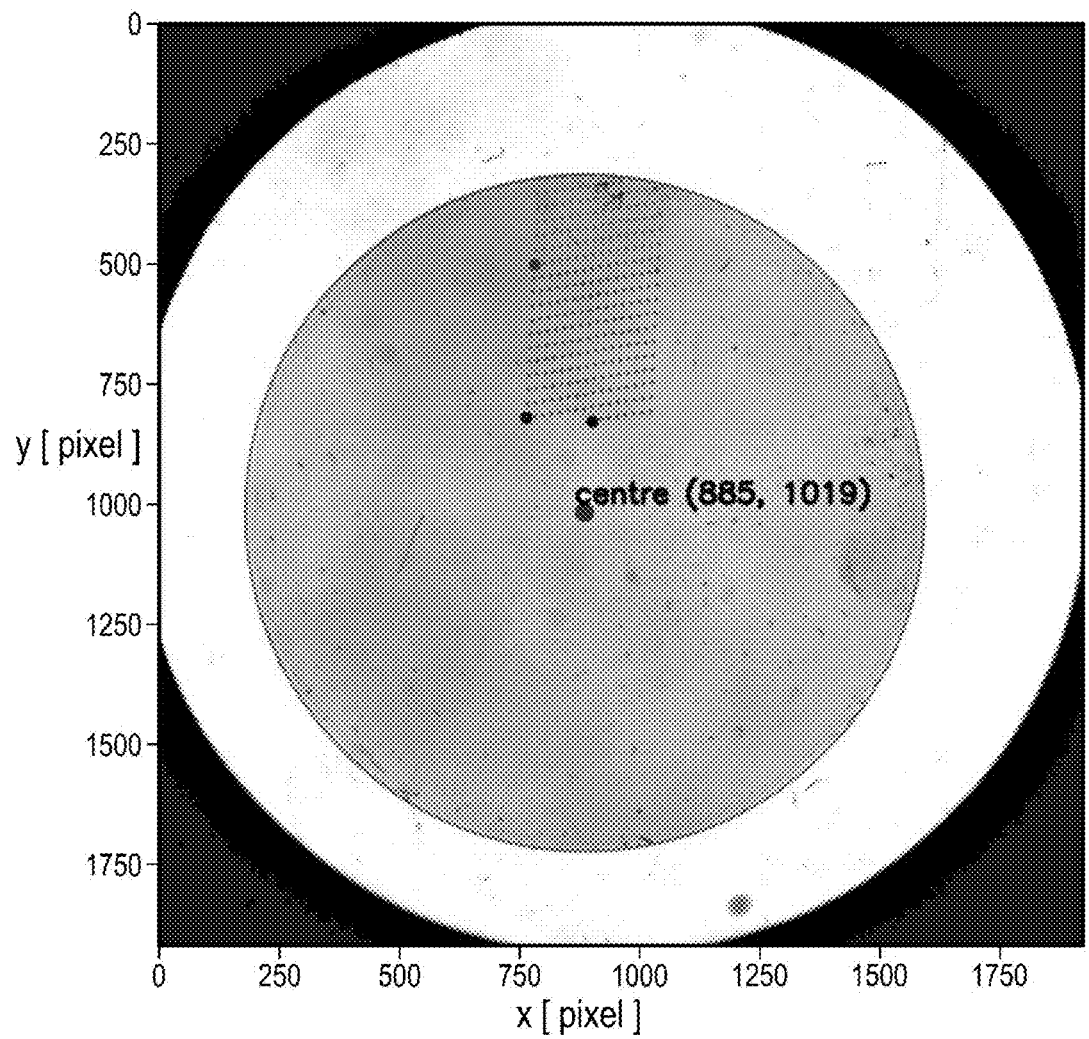
FIG. 15 shows a Recon image of a printed curved surface of a spectacle lens substrate with a diameter of 65 mm a recognized contour.

In FIG. 15, the outer contour of the spectacle lens substrate 4 and its center (pixel coordinates in image) are shown. The center has been determined by minimizing the sum of its squared distances to the points forming the lens contour. Knowing the lens center position, the average distance from it to all contour points of the spectacle lens substrate 4 is calculated. From these numbers and a known physical diameter of the spectacle lens substrate 4 (65 mm), the proper scaling factor (pixel-to-micro meter) can be calculated.

In a further step, the applied wax droplets are recognized by OpenCV and their position is partly overlaid with a marker (black dots in FIG. 15). Around these markers a convex hull is constructed and three of its points (marked as big black dots) are used to derive unit vectors. These vectors are needed to construct a rotation matrix to align the image and the coordinate system of the read-in nozzle positions of the printhead 5. The center position of the surface 3 from the Recon image is used for the (x,y) translation of the read-in nozzle array, too.

Figure 16:
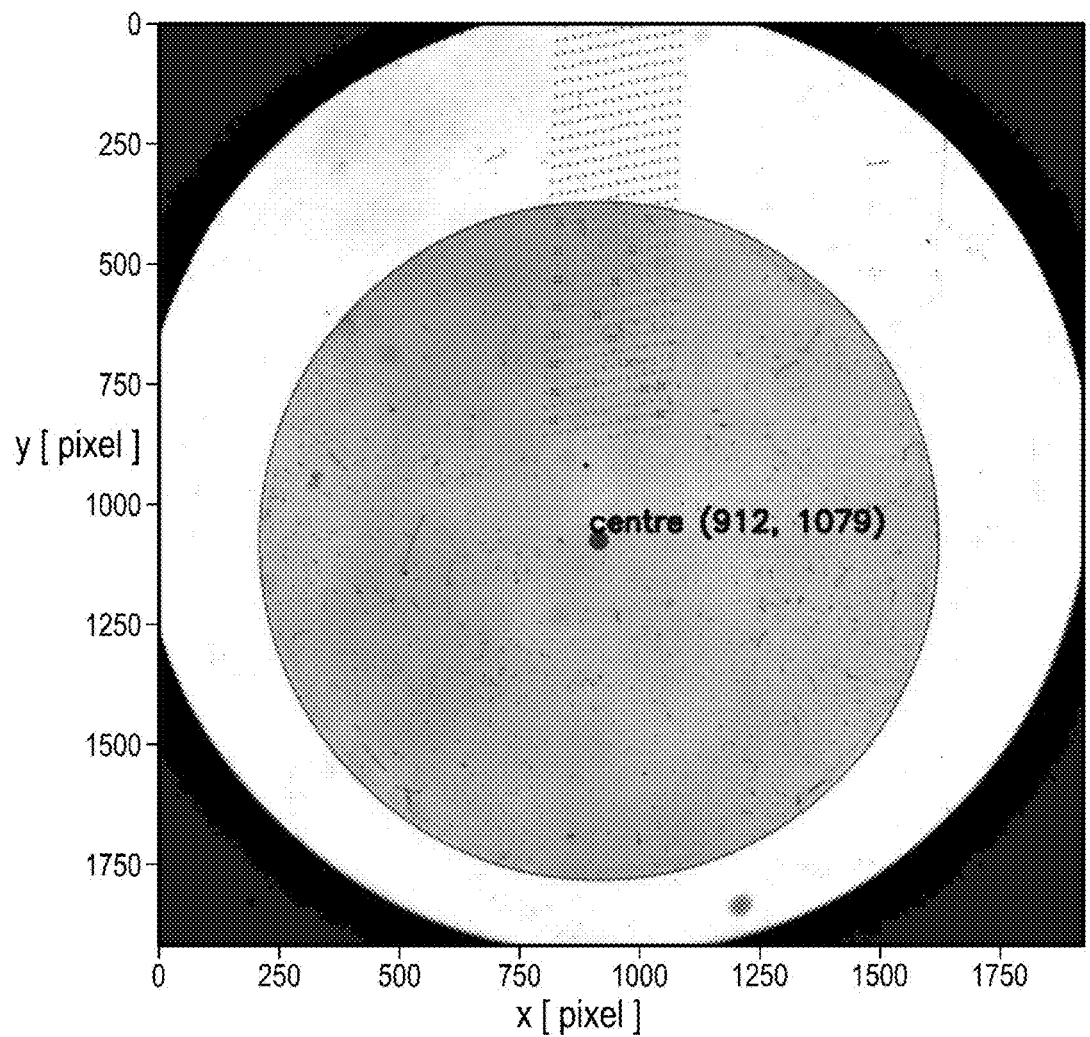
FIG. 16 shows another Recon image of the printed curved surface. The wax pattern is overlaid with the read-in nozzle array data.

In FIG. 16, the printed wax dots are overlaid with the "theoretical" positions of the printing nozzles 6, 6*a*, 6*b*, 6*c* (black dots) and they align well with the observed dots. The midpoints of tiles used for microscopic analysis (coordinates of "real" droplets) are depicted as crosses.

Acquisition and Analysis of Microscope Images

Microscope images were obtained using a Zeiss Smart Zoom 5 microscope. The microscope was tilted according to the tile position on the surface 3 of the spectacle lens substrate 4 to minimize the out-of-focus areas and maximize contrast. Settings used for the microscopic image acquisition are as follows: microscopy type—image, objective—5, magnification—101×, resolution—2.2040 µm px$^{-1}$, exposure time 0.2819 ms, illumination—top right light.

Figure 17:
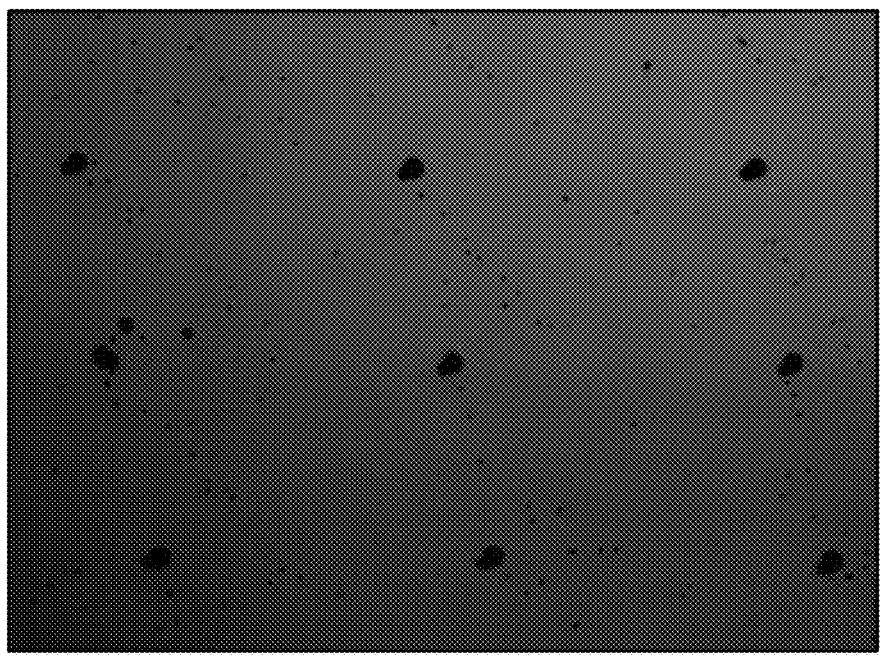
FIG. 17 shows an original microscope image of tile #5 from the surface printed with a norm value of 50.

As for the Recon images, OpenCV and Python were used to analyze the microscopic images. Tile number 5 of the surface 3 printed with a norm value of 50 is depicted in FIG. 17. The center point of this tile is marked on the Recon image in FIG. 16. Going from the center to the top of the image, on the left side, it is the fifth of the eight black crosses.

Figure 18:
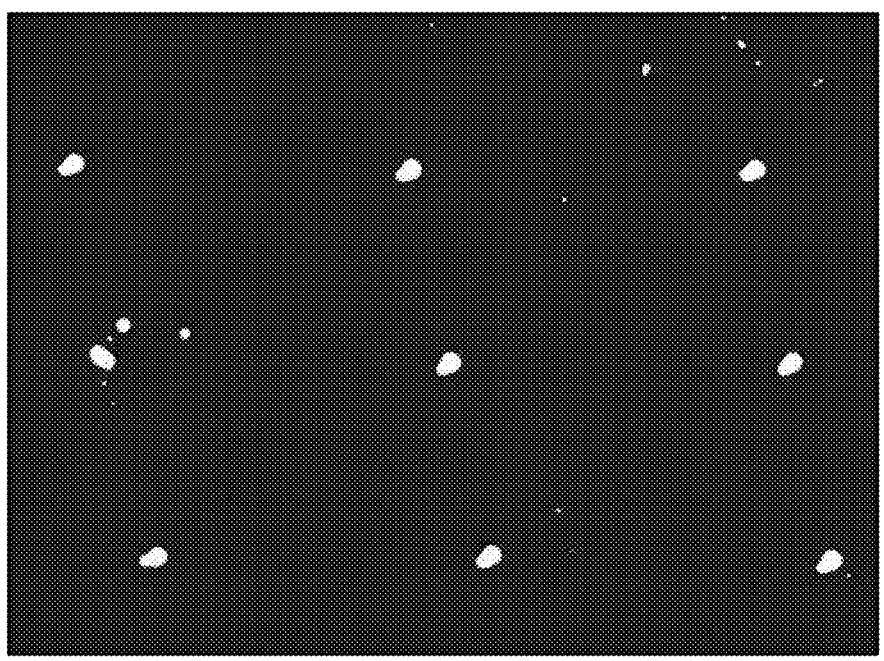
FIG. 18 shows a black and white threshold-ed microscope image derived from the image shown in FIG. 17.

The first step of image analysis is the conversion of the raw image to gray scale. Secondly, a Gaussian blur is applied onto that image to get rid of pixel noise affecting the contour recognition (FIG. 18). The necessary "pre-treatment" of images depends on the employed analysis technique and used experimental settings. For example, the recognition of large dots ("main features") worked best using a Gaussian blur with kernel size of 15. For the detection of smaller-sized satellites, a Gaussian blur using the kernel size of 5 was used.

Figure 19:
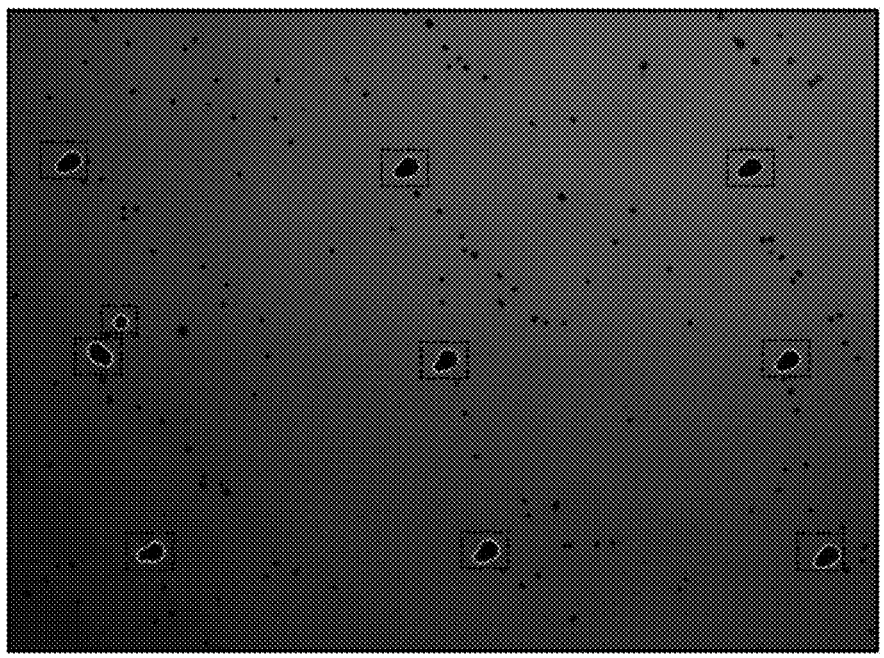
FIG. 19 shows the microscope image of FIG. 17 with marked main features and satellites.

From the Gaussian-blurred gray scale images, black and white images can be obtained using an adaptive threshold function. The parameters used here are (111-6) for the detection of main features and (141-6) for satellite detection, respectively. The threshold-ed black and white image for the detection of main features is shown in FIG. 19. Contour recognition is performed on black and white images and detected blobs classified as main features (A<300 px$^2$) or satellites (20 px$^2$<A<300 px$^2$). The first derived quality parameter is the number of satellites per tile (the more, the worse). The second quality parameter is the circularity of the detected main features (equals one for a perfect circle, see equation (I)).

$$C = \$ * \pi * A/P^2 \qquad \text{equation (I)}$$

with C = circularity, A = blob area in square pixels,

P = blob perimeter in pixels

Found main features are marked with dotted rectangles in FIG. 19, found satellites are marked as black dots.

Parameter Mapping and Optimization

For each of the analyzed microscope images the derived quality parameters (circularity of mean features and number of satellites) are attributed to the center point of the corresponding tile obtained from the Recon images. For convenience, the calculated (x,y) points are expressed as relative radius of spectacle lens substrates 4 with a diameter of 65 mm (see y-axis in FIGS. 20 to 22). For the systematic build-up of a data base or look-up table 13 the surface-to-nozzle distance as non-lens specific property is typically used.

Figure 20:
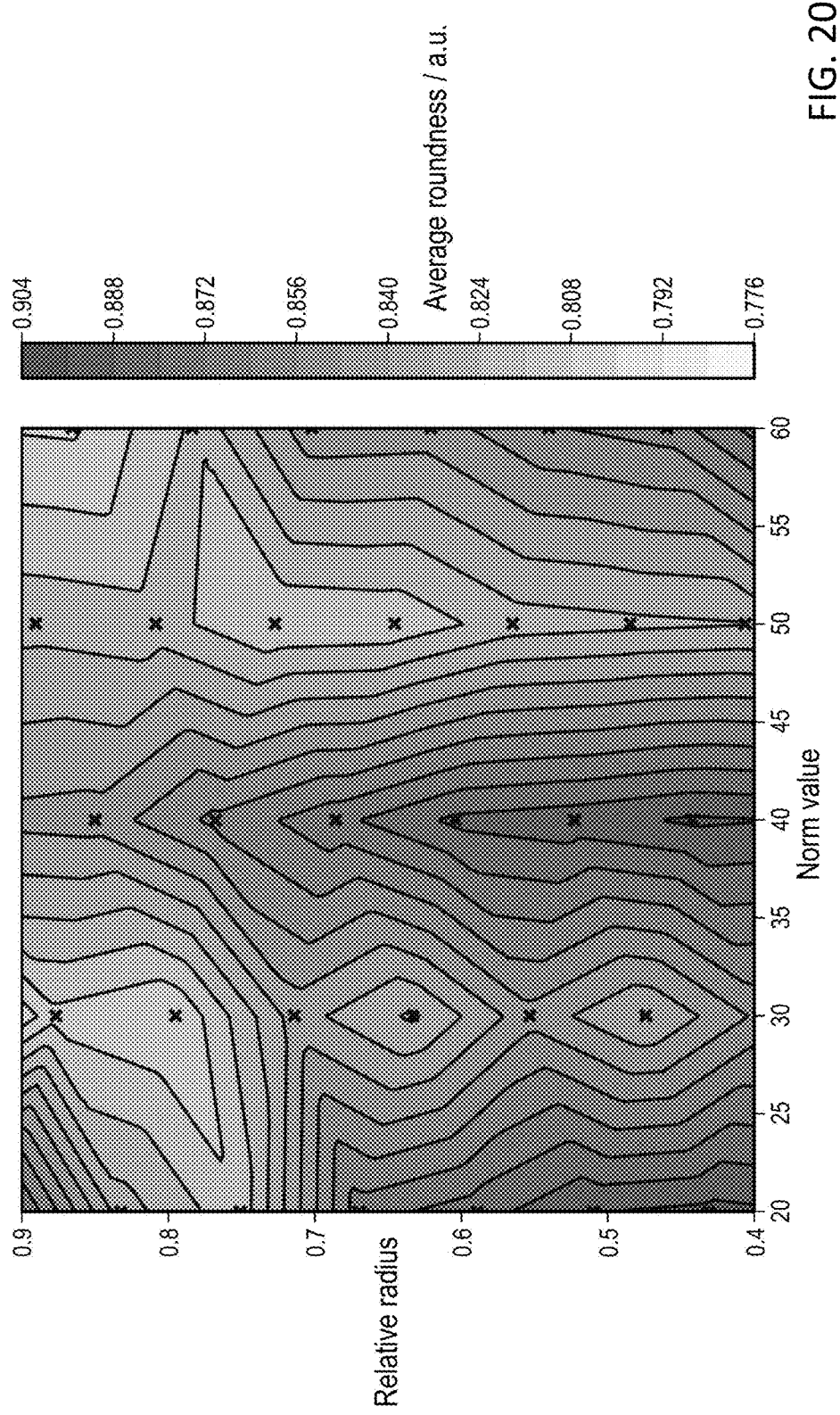
FIG. 20 shows the average circularity of the main features depending on the relative radius and applied norm values.
Figure 21:
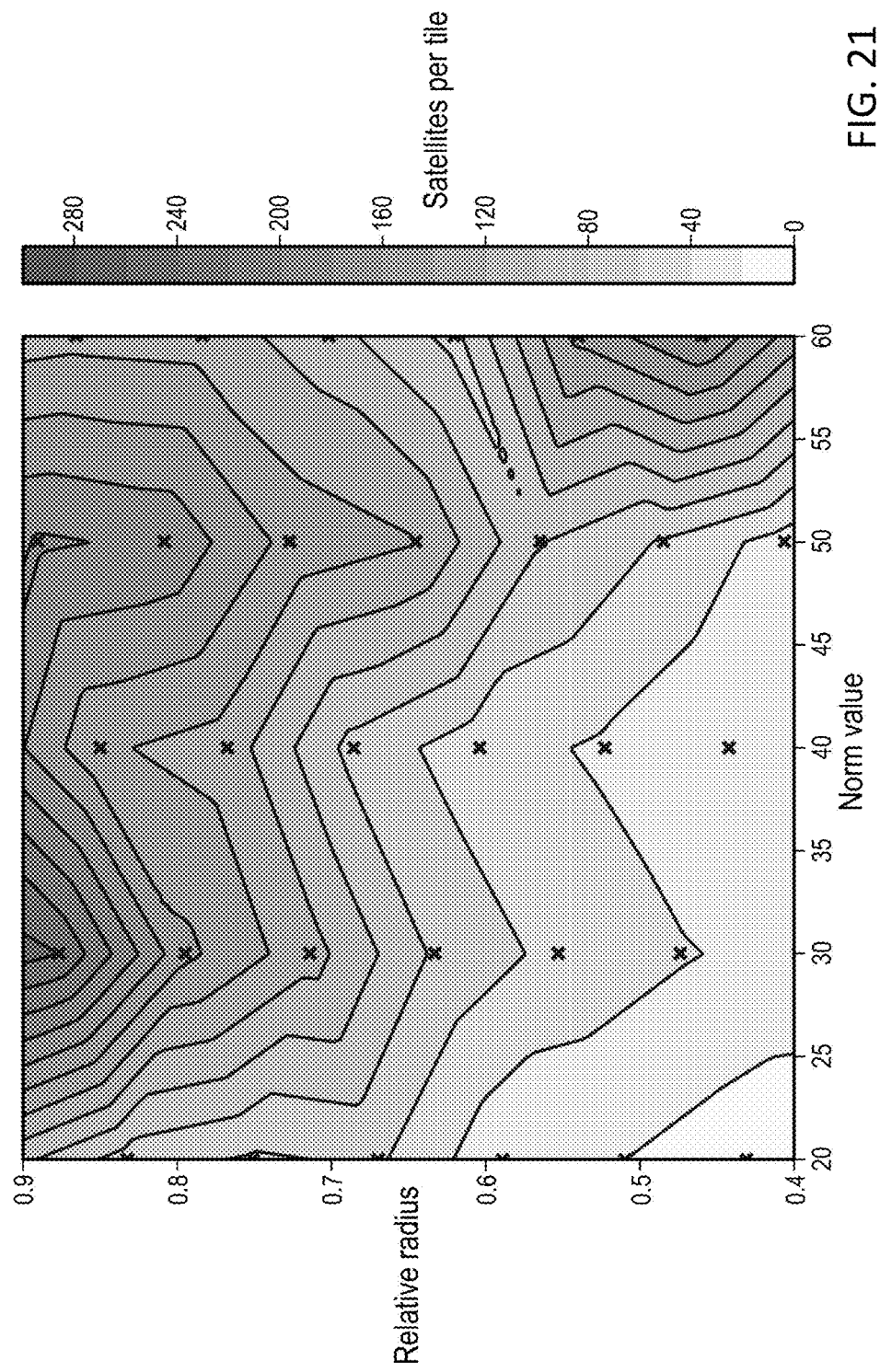
FIG. 21 shows the number of satellites per tile depending on the relative radius and applied norm value.

Each of the black crosses in FIGS. 20 and 21 represents one experimentally tested setting. A finer mesh is used to linearly interpolate between these supporting points. Visually, a norm value of 40 seems to be a good choice for the applied conditions. Regarding the number of formed satellites, a norm value of 40 seems to work well, too. Finally, the purpose is to define a cost function based on proper quality parameters to optimize the printing process against.

Figure 22:
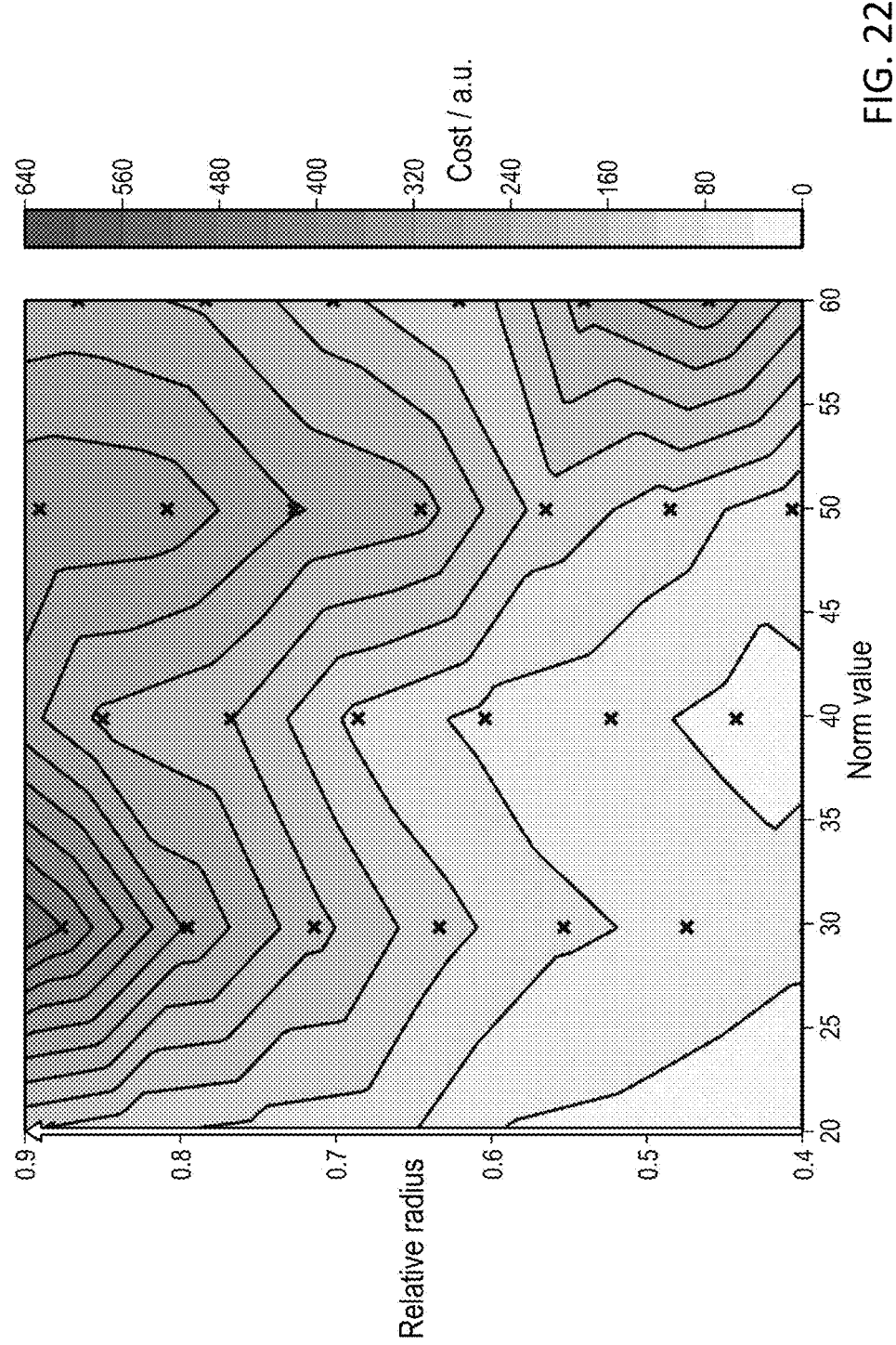
FIG. 22 shows a graphic representation of a cost function depending on the relative radius and applied norm values.

As an example, the function shown in equation (II) is used to create FIG. 22, i.e., to calculate the cost depending on different relative radii and norm values wherein the number of formed satellites and the circularity are taken into account as quality parameters.

$$\text{cost} = gridz1/(gridz0)^3 \qquad \text{equation (II)}$$

The variable gridz1 holds the number of satellites per tile and the variable gridz0 holds the average circularity of the detected droplets. Given that it has to be passed from 0 to 1 (relative radius of the spectacle lens substrate 4) through this cost function, a "cheapest" route can be found using an optimizer of choice and include further side conditions if needed. For example, the cost function might focus on satellites or circularity depending on the concrete application. The "cheapest route" for this specific example is marked with a black arrow and corresponds to a norm value of 20. By defining a different cost function, different cheapest routes will be obtained that must not necessarily be linear.

The black arrow in FIG. 22 is insofar the graphic representation of the parameter map 12 that comprises the determined printing parameter value 1, i.e., the norm value of 20. In other cases, the determined optimized norm value might vary with the relative radius so that different norm values are determined for different printing nozzle groups 10a, 10b, 10c, 10d, 10e.

Figure 23:
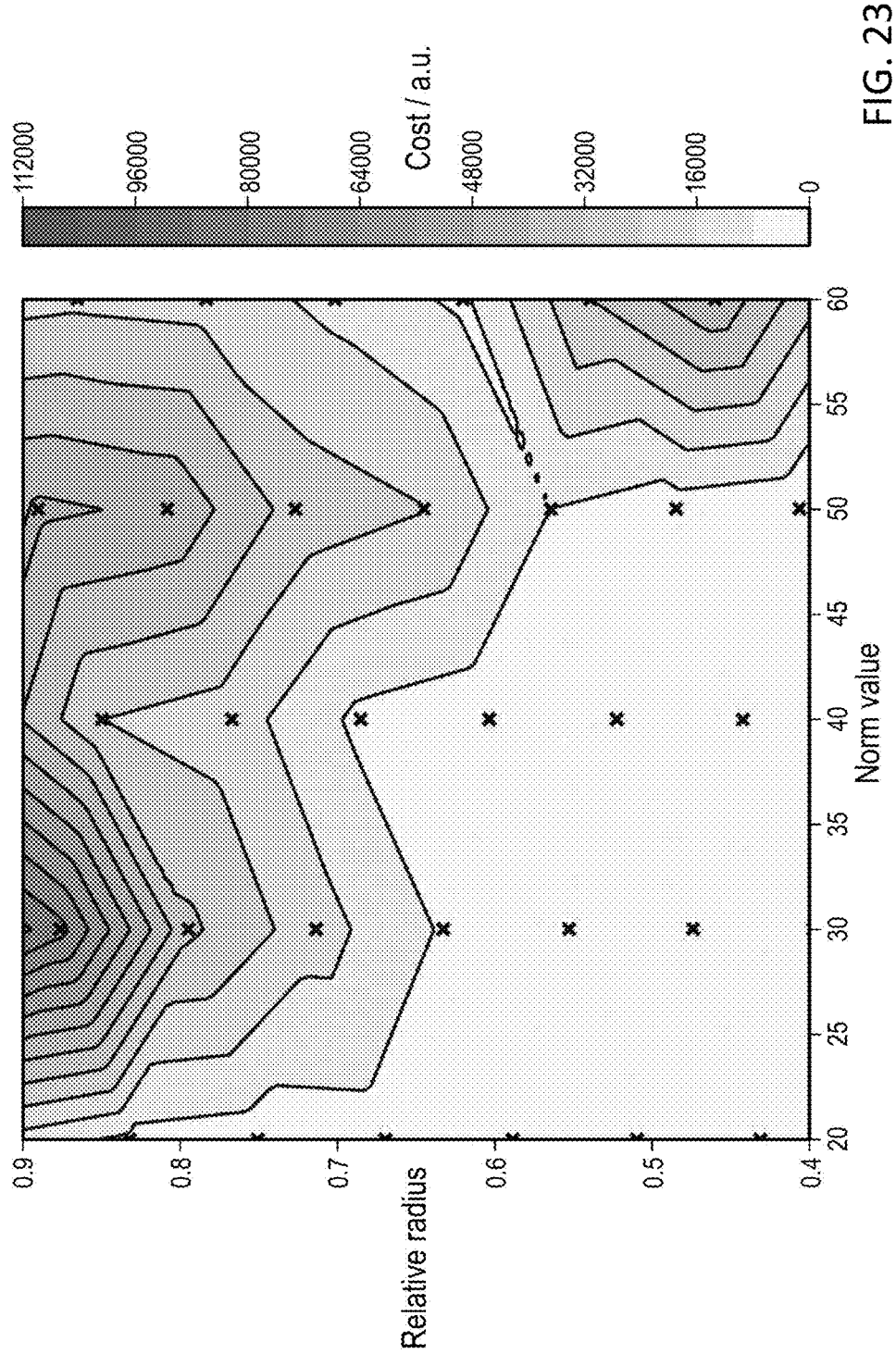
FIG. 23 shows a graphic representation of another cost function depending on the relative radius and applied norm values.

FIG. 23 shows a graphic representation similar to FIG. 22 wherein a differently defined cost function is used (equation (III))

$$\text{Cost} = \text{cost} = gridz1/(gridz0)^2 \qquad \text{equation (III)}$$

As the number of satellites is less pronounced in equation (III) compared to equation (II), i.e., (gridz1)$^2$ instead of (grindz1)$^3$, the influence of both quality parameters is more balanced.

Exemplary embodiments of the disclosure are provided in the following clauses.

Clause 1. A computer-implemented method for determining printing parameter values of an inkjet printing device for printing a pattern on a surface of a spectacle lens substrate, the inkjet printing device including a printhead with a plurality of printing nozzles, wherein the method comprises:
grouping the plurality of printing nozzles into at least two printing nozzle groups, and individually determining a printing parameter value for at least one adjustable printing parameter of each printing nozzle group.

Clause 2. The method of clause 1, wherein the at least one adjustable printing parameter is selected from the group consisting of ejection temperature, jetting duration, jetting frequency, norm value, a wave form parameter, and an adjustable ink property.

Clause 3. The method of clause 1 or clause 2, wherein each printing nozzle group comprises a single printing nozzle.

Clause 4. The method of any one of clauses 1 to 3, wherein the method comprises:
obtaining input data concerning geometric features of the surface of the spectacle lens substrate and the printhead,
wherein the printing parameter value is individually determined depending on the input data.

Clause 5. The method of clause 4, wherein the input data is used to determine a geometric relationship between the surface of the spectacle lens substrate and the printhead wherein the geometric relationship is described by at least one parameter selected from the group consisting of displacement vector, velocity vector, incident angle α, distance Δ, and arc length s.

Clause 6. The method of clause 4 or clause 5, wherein the input data comprises data concerning an environmental condition, a non-adjustable ink property and/or a material property of the spectacle lens substrate.

Clause 7. The method of any one of clauses 1 to 6, wherein the method step of individually determining the printing parameter value for the at least one adjustable printing parameter includes deducing a parameter map comprising an assignment of printing parameter values to a specific group of points on the surface of the spectacle lens substrate.

Clause 8. The method of clause 7 at least in combination with clause 5, wherein the parameter map is deduced by optimizing a cost function applied to a correlation of parameters describing the geometric relationship between the surface of the spectacle lens substrate and the printhead with adjustable printing parameters.

Clause 9. The method of clause 8, wherein the optimizing uses at least one method selected from the group of steepest gradient decent, genetic algorithms and machine learning.

Clause 10. The method of clause 8 or clause 9, wherein the cost function defines costs depending on quality parameters.

Clause 11. The method of clause 10, wherein the quality parameters include the number of formed satellites and/or the circularity of printed mean features.

Clause 12. The method of any one of clauses 7 to 11, wherein the parameter map is deduced by using a look-up table.

Clause 13. The method of any one of clauses 1 to 12, wherein the surface of the spectacle lens substrate is a curved surface.

Clause 14. The method of any one of clauses 1 to 13, wherein the at least two printing nozzle groups are to be used within a single printing pass.

Clause 15. The method of any one of clauses 1 to 14, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

Clause 16. The method of any one of clauses 1 to 15, wherein the printing parameter value for the at least one adjustable printing parameter of each printing nozzle group is individually determined such that a pose of both the spectacle lens substrate and the printhead remains constant with respect to each other during the printing of the pattern on the surface of the spectacle lens substrate.

Clause 17. A data processing system comprising a processor and a storage medium coupled to the processor, wherein the processor is adapted to determine printing parameter values of an inkjet printing device for printing a pattern on a curved surface of a spectacle lens substrate, the inkjet printing device including a printhead with a plurality of printing nozzles, based on a computer program stored on the storage medium, wherein the processor is adapted to group the plurality of printing nozzles into at least two printing nozzle groups and individually determine a printing parameter value for at least one adjustable printing parameter of each printing nozzle group.

Clause 18. The data processing system of clause 17, wherein the at least one adjustable printing parameter is selected from the group of ejection temperature, jetting duration, jetting frequency, norm value, a wave form parameter, and an adjustable ink property.

Clause 19. The data processing system of clause 17 or clause 18, wherein each printing nozzle group comprises a single printing nozzle.

Clause 20. The data processing system of any one of clauses 17 to 19, wherein the processor is adapted to obtain input data concerning geometric features of the surface of the spectacle lens substrate and the printhead and wherein the processor is adapted to individually determine the printing parameter value depending on the input data.

Clause 21. The data processing system of clause 20, wherein the processor is adapted to use the input data to determine a geometric relationship between the surface of the spectacle lens substrate and the printhead wherein the geometric relationship is described by at least one parameter selected from the group consisting of displacement vector, velocity vector, incident angle $\alpha$, distance $\Delta$, and arc length s.

Clause 22. The data processing system of clause 20 or clause 21, wherein the input data comprises data concerning an environmental condition, a non-adjustable ink property and/or a material property of the spectacle lens substrate.

Clause 23. The data processing system of any one of clauses 17 to 22, wherein the processor is adapted to deduce a parameter map comprising an assignment of printing parameter values to a specific group of points on the surface of the spectacle lens substrate.

Clause 24. The data processing system of clause 23 at least in combination with clause 21, wherein the processor is adapted to deduce the parameter map by optimizing a cost function applied to a correlation of parameters describing the geometric relationship between the surface of the spectacle lens substrate and the printhead with adjustable printing parameters.

Clause 25. The data processing system of clause 24, wherein the optimizing uses at least one method selected from the group of steepest gradient decent, genetic algorithms and machine learning.

Clause 26. The data processing system of clause 24 or 25, wherein the cost function defines costs depending on quality parameters.

Clause 27. The data processing system of clause 26, wherein the quality parameters include the number of formed satellites and/or the circularity of printed mean features.

Clause 28. The data processing system of any one of clauses 23 to 27, wherein the parameter map is deduced by using a look-up table.

Clause 29. The data processing system of any one of clauses 17 to 28, wherein the surface of the spectacle lens substrate is a curved surface.

Clause 30. The data processing system of any one of clauses 17 to 29, wherein at least two printing nozzle groups are to be used within a single printing pass.

Clause 31. The data processing system of any one of clauses 17 to 30, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

Clause 32. The data processing system of any one of clauses 17 to 31, wherein the printing parameter value for the at least one adjustable printing parameter of each printing nozzle group is individually determined such that a pose of both the spectacle lens substrate and the printhead remains constant with respect to each other during the printing of the pattern on the surface of the spectacle lens substrate.

Clause 33. A computer program comprising instructions which, when the program is executed by a computer, cause the computer to determine printing parameter values of an inkjet printing device for printing a pattern on a curved surface of a spectacle lens substrate, the inkjet printing device including a printhead with a plurality of printing nozzles, wherein the instructions cause the computer to group the plurality of printing nozzles into at least two printing nozzle groups and individually determine a printing parameter value for at least one adjustable printing parameter of each printing nozzle group.

Clause 34. The computer program of clause 33, wherein the at least one adjustable printing parameter is selected from the group of ejection temperature, jetting duration, jetting frequency, norm value, a wave form parameter, and an adjustable ink property.

Clause 35. The computer program of clause 33 or clause 34, wherein each printing nozzle group comprises a single printing nozzle.

Clause 36. The computer program of any one of clauses 33 to 35, wherein the instructions cause the computer to obtain input data concerning geometric features of the surface of the spectacle lens substrate and the printhead and wherein the computer is caused to individually determine the printing parameter value depending on the input data.

Clause 37. The computer program of clause 36, wherein the instructions cause the computer to use the input data to determine a geometric relationship between the surface of the spectacle lens substrate and the printhead wherein the geometric relationship is described by at least one parameter selected from the group consisting of displacement vector, velocity vector, incident angle α, distance Δ, and arc length s.

Clause 38. The computer program of clause 36 or clause 37, wherein the input data comprises data concerning an environmental condition, a non-adjustable ink property and/or a material property of the spectacle lens substrate.

Clause 39. The computer program of any one of clauses 33 to 38, wherein the instructions cause the computer to deduce a parameter map comprising an assignment of printing parameter values to a specific group of points on the surface of the spectacle lens substrate.

Clause 40. The computer program of clause 39 at least in combination with clause 37, wherein the instructions cause the computer to deduce the parameter map by optimizing a cost function applied to a correlation of parameters describing the geometric relationship between the surface of the spectacle lens substrate and the printhead with adjustable printing parameters.

Clause 41. The computer program of clause 40, wherein the optimizing uses at least one method selected from the group of steepest gradient decent, genetic algorithms and machine learning.

Clause 42. The computer program of clause 40 or clause 41, wherein the cost function defines costs depending on quality parameters.

Clause 43. The computer program of clause 42, wherein the quality parameters include the number of formed satellites and/or the circularity of printed mean features.

Clause 44. The computer program of any one of clauses 39 to 43, wherein the parameter map is deduced by using a look-up table.

Clause 45. The computer program of any one of clauses 33 to 44, wherein the surface of the spectacle lens substrate is a curved surface.

Clause 46. The computer program of any one of clauses 33 to 45, wherein the at least two printing nozzle groups are to be used within a single printing pass.

Clause 47. The computer program of any one of clauses 33 to 46, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

Clause 48. The computer program of any one of clauses 33 to 47, wherein the printing parameter value for the at least one adjustable printing parameter of each printing nozzle group is individually determined such that a pose of both the spectacle lens substrate and the printhead remains constant with respect to each other during the printing of the pattern on the surface of the spectacle lens substrate.

Clause 49. A non-transitory computer-readable storage medium comprising instructions which, when executed by a computer, cause the computer to determine printing parameter values of an inkjet printing device for printing a pattern on a curved surface of a spectacle lens substrate, the inkjet printing device including a printhead with a plurality of printing nozzles, wherein the instructions cause the computer to group the plurality of printing nozzles into at least two printing nozzle groups and individually determine a printing parameter value for at least one adjustable printing parameter of each printing nozzle group.

Clause 50. The non-transitory computer-readable storage medium of clause 49, wherein the at least one adjustable printing parameter is selected from the group of ejection temperature, jetting duration, jetting frequency, norm value, a wave form parameter, and an adjustable ink property.

Clause 51. The non-transitory computer-readable storage medium of clause 49 or clause 50, wherein each printing nozzle group comprises a single printing nozzle.

Clause 52. The non-transitory computer-readable storage medium of any one of clauses 49 to 51, wherein the instructions cause the computer to obtain input data concerning geometric features of the surface of the spectacle lens substrate and the printhead and wherein the computer is caused to individually determine the printing parameter value depending on the input data.

Clause 53. The non-transitory computer-readable storage medium of clause 52, wherein the instructions cause the computer to use the input data to determine a geometric relationship between the surface of the spectacle lens substrate and the printhead wherein the geometric relationship is described by at least one parameter selected from the group consisting of displacement vector, velocity vector, incident angle α, distance Δ, and arc length s.

Clause 54. The non-transitory computer-readable storage medium of clause 52 or clause 53, wherein the input data comprises data concerning an environmental condition, a non-adjustable ink property and/or a material property of the spectacle lens substrate.

Clause 55. The non-transitory computer-readable storage medium of any one of clauses 49 to 54, wherein the instructions cause the computer to deduce a parameter map comprising an assignment of printing parameter values to a specific group of points on the surface of the spectacle lens substrate.

Clause 56. The non-transitory computer-readable storage medium of clause 55 at least in combination with clause 53, wherein the instructions cause the computer to deduce the parameter map by optimizing a cost function applied to a correlation of parameters describing the geometric relationship between the surface of the spectacle lens substrate and the printhead with adjustable printing parameters.

Clause 57. The non-transitory computer-readable storage medium of clause 56, wherein the optimizing uses at least one method selected from the group of steepest gradient decent, genetic algorithms and machine learning.

Clause 58. The non-transitory computer-readable storage medium of clause 56 or clause 57, wherein the cost function defines costs depending on quality parameters.

Clause 59. The non-transitory computer-readable storage medium of clause 58, wherein the quality parameters include the number of formed satellites and/or the circularity of printed mean features.

Clause 60. The non-transitory computer-readable storage medium of any one of clauses 55 to 59, wherein the parameter map is deduced by using a look-up table.

Clause 61. The non-transitory computer-readable storage medium of any one of clauses 49 to 60, wherein the surface of the spectacle lens substrate is a curved surface.

Clause 62. The non-transitory computer-readable storage medium of any one of clauses 49 to 61, wherein the at least two printing nozzle groups are to be used within a single printing pass.

Clause 63. The non-transitory computer-readable storage medium of any one of clauses 49 to 62, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

Clause 64. The non-transitory computer-readable storage medium of any one of clauses 49 to 63, wherein the printing parameter value for the at least one adjustable printing parameter of each printing nozzle group is individually determined such that a pose of both the spectacle lens substrate and the printhead remains constant with respect to each other during the printing of the pattern on the surface of the spectacle lens substrate.

Clause 65. A method for inkjet printing wherein a pattern is printed on a curved surface of a spectacle lens substrate with an inkjet printing device including a printhead with a plurality of printing nozzles using a printing parameter value for at least one adjustable printing parameter, wherein the printing parameter value for the at least one adjustable printing parameter is determined according to a computer-implemented method of any one of clauses 1 to 16.

Clause 66. The method of clause 65, wherein the pattern is printed for at least one process selected from the group consisting of permanent lens marking, temporary lens marking, application of masking layers, application of adhesive layer spots, additive manufacturing, and tinting.

Clause 67. The method of clause 65 or clause 66, wherein a tilt angle of the printhead relative to the surface of the spectacle lens substrate is not adjusted prior to printing and/or during printing.

Clause 68. The method of any one of clauses 65 to 67, wherein a pose of both the spectacle lens substrate and the printhead remains constant with respect to each other during the printing of the pattern on the surface of the spectacle lens substrate.

Clause 69. An inkjet printing device for printing a pattern on a curved surface of a spectacle lens substrate, the inkjet printing device including: a printhead with a plurality of printing nozzles, and a data processing system comprising a processor and a storage medium coupled to the processor, wherein the processor is adapted to determine printing parameter values based on a computer program stored on the storage medium, wherein the processor is adapted to group the plurality of printing nozzles into at least two printing nozzle groups and individually determine a printing parameter value for at least one adjustable printing parameter of each printing nozzle group.

Clause 70. The inkjet printing device of clause 69, wherein the at least one adjustable printing parameter is selected from the group of ejection temperature, jetting duration, jetting frequency, norm value, a wave form parameter, and an adjustable ink property.

Clause 71. The inkjet printing device of clause 69 or clause 70, wherein each printing nozzle group comprises a single printing nozzle.

Clause 72. The inkjet printing device of any one of clauses 69 to 71, wherein the processor is adapted to obtain input data concerning geometric features of the surface of the spectacle lens substrate and the printhead and wherein the processor is adapted to individually determine the printing parameter value depending on the input data.

Clause 73. The inkjet printing device of clause 72, wherein the processor is adapted to use the input data to determine a geometric relationship between the surface of the spectacle lens substrate and the printhead wherein the geometric relationship is described by at least one parameter selected from the group consisting of displacement vector, velocity vector, incident angle $\alpha$, distance $\Delta$, and arc length s.

Clause 74. The inkjet printing device of clause 72 or clause 73, wherein the input data comprises data concerning an environmental condition, a non-adjustable ink property and/or a material property of the spectacle lens substrate.

Clause 75. The inkjet printing device of any one of clauses 69 to 74, wherein the processor is adapted to deduce a parameter map comprising an assignment of printing parameter values to a specific group of points on the surface of the spectacle lens substrate.

Clause 76. The inkjet printing device of clause 75 at least in combination with clause 59, wherein the processor is adapted to deduce the parameter map by optimizing a cost function applied to a correlation of parameters describing the geometric relationship between the surface of the spectacle lens substrate and the printhead with adjustable printing parameters.

Clause 77. The inkjet printing device of clause 76, wherein the optimizing uses at least one method selected from the group of steepest gradient decent, genetic algorithms and machine learning.

Clause 78. The inkjet printing device of clause 76 or clause 77, wherein the cost function defines costs depending on quality parameters.

Clause 79. The inkjet printing device of clause 78, wherein the quality parameters include the number of formed satellites and/or the circularity of printed mean features.

Clause 80. The inkjet printing device of any one of clauses 75 to 79, wherein the parameter map is deduced by using a look-up table.

Clause 81. The inkjet printing device of any one of clauses 69 to 80, wherein the surface of the spectacle lens substrate is a curved surface.

Clause 82 The inkjet printing device of any one of clauses 69 to 81, wherein the at least two printing nozzle groups are to be used within a single printing pass.

Clause 83. The inkjet printing device of any one of clauses 69 to 82, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

Clause 84. The inkjet printing device of any one of clauses 69 to 83, wherein the printing parameter value for the at least one adjustable printing parameter of each printing nozzle group is individually determined such that a pose of both the spectacle lens substrate and the printhead remains constant with respect to each other during the printing of the pattern on the surface of the spectacle lens substrate.

Clause 85. A spectacle lens substrate with a pattern printed on a curved surface of the spectacle lens substrate obtainable by a method of any one of clauses 65 to 68.

Clause 86. A data set in the form of a computer-readable data carrier signal comprising at least one kind of the following kinds of data: (i) printing parameter values for at least one adjustable printing parameter individual for at least two printing nozzle groups of a inkjet printing device including a printhead with a plurality of printing nozzles configured to be fed to the inkjet printing devices for printing a pattern on a surface of a spectacle lens substrate or (ii) data containing computer-readable instructions for controlling an inkjet printing device to print a pattern on a surface of a spectacle lens substrate by applying individual printing parameter values for at least one adjustable printing parameter to at least two printing nozzle groups of the inkjet printing device including a printhead with a plurality of printing nozzles.

Clause 87. The data set of clause 86, wherein the at least one adjustable printing parameter is selected from the group of ejection temperature, jetting duration, jetting frequency, norm value, a wave form parameter, and an adjustable ink property.

Clause 88. The data of clause 86 or clause 87, wherein each printing nozzle group comprises a single printing nozzle.

Clause 89. The data set of any one of clauses 86 to 88, wherein the instructions cause the computer to obtain input data concerning geometric features of the surface of the spectacle lens substrate and the printhead and wherein the computer is caused to individually determine the printing parameter value depending on the input data.

Clause 90. The data set of clause 89, wherein the instructions cause the computer to use the input data to determine a geometric relationship between the surface of the spectacle lens substrate and the printhead wherein the geometric relationship is described by at least one parameter selected from the group consisting of displacement vector, velocity vector, incident angle α, distance Δ, and arc length s.

Clause 91. The data set of clause 89 or clause 90, wherein the input data comprises data concerning an environmental condition, a non-adjustable ink property and/or a material property of the spectacle lens substrate.

Clause 92. The data set of any one of clauses 86 to 91, wherein the instructions cause the computer to deduce a parameter map comprising an assignment of printing parameter values to a specific group of points on the surface of the spectacle lens substrate.

Clause 93. The data set of clause 92 at least in combination with clause 84, wherein the instructions cause the computer to deduce the parameter map by optimizing a cost function applied to a correlation of parameters describing the geometric relationship between the surface of the spectacle lens substrate and the printhead with adjustable printing parameters.

Clause 94. The data set of clause 93, wherein the optimizing uses at least one method selected from the group of steepest gradient decent, genetic algorithms and machine learning.

Clause 95. The data set of clause 93 or clause 94, wherein the cost function defines costs depending on quality parameters.

Clause 96. The data set of clause 95, wherein the quality parameters include the number of formed satellites and/or the circularity of printed mean features.

Clause 97. The data set of any one of clauses 92 to 96, wherein the parameter map is deduced by using a look-up table.

Clause 98. The non-transitory computer-readable storage medium of any one of clauses 86 to 97, wherein the surface of the spectacle lens substrate is a curved surface.

Clause 99. The non-transitory computer-readable storage medium of any one of clauses 86 to 98, wherein the at least two printing nozzle groups are to be used within a single printing pass.

Clause 100. The non-transitory computer-readable storage medium of any one of clauses 86 to 99, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

Clause 101. The non-transitory computer-readable storage medium of any one of clauses 86 to 100, wherein the printing parameter value for the at least one adjustable printing parameter of each printing nozzle group is individually determined such that a pose of both the spectacle lens substrate and the printhead remains constant with respect to each other during the printing of the pattern on the surface of the spectacle lens substrate.

Clause 102. A data set data set in the form of a computer-readable data signal comprising at least one kind of the following kinds of data: (i) a virtual representation of the device according to any one of clauses 69 to 84 configured to be fed to one or more manufacturing machines for manufacturing the device or (ii) data containing computer-readable instructions for controlling one or more manufacturing machines to manufacture the device according to any one of clauses 69 to 84.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS 1 printing parameter value
2 inkjet printing device
3 surface
4 spectacle lens substrate
5 printhead
6, 6a, 6b, 6c printing nozzle
7, 7a, 7b, 7c, 7d, 7e, 7f printing parameter
8, 8a, 8b, 8c, 8d input data
9 ink
10a, 10b, 10c, 10d, 10e printing nozzle group
11, 11a, 11b, 11c parameter describing the geometric relationship
12 parameter map 13 look-up table
20 processor
21 storage medium
100 method
200 data processing system
D diameter
dx, dy, dz discretized differences within the used coordinate system
j ejection vector
m moving direction of the printhead
n normal vector
r true front curve
s arc length
α incident angle
$\Delta_1$, $\Delta_2$ distance between printing nozzle and substrate surface
S1 obtaining input data concerning geometric features of the surface of the spectacle lens substrate and the printhead of the inkjet printing device
S2 grouping a plurality of printing nozzles into at least two printing nozzle groups
S3 individually determining printing parameter values for adjustable printing parameters for each printing nozzle group
S4 providing a look-up table and a cost function
S5 applying and optimizing the cost function
S6 deducing a parameter map

The invention claimed is:

1. A computer-implemented method to determine printing parameter values of an inkjet printing device for printing a pattern on a surface of a spectacle lens substrate having a curved surface, the inkjet printing device having a printhead as one single component with a plurality of printing nozzles, the method comprising the following method steps:
(S2): grouping the plurality of printing nozzles into at least two printing nozzle groups; and
(S3): individually determining a printing parameter value for at least one adjustable printing parameter of each printing nozzle group,
wherein the at least one adjustable printing parameter is selected from the group consisting of an ejection temperature, a jetting duration, a jetting frequency, a norm value, a wave form parameter, and an adjustable ink property,
wherein the method step (S3) of individually determining the printing parameter value for the at least one adjustable printing parameter comprises deducing a parameter map including assigning different printing parameters to different regions of the curved surface, and
wherein the parameter map is deduced by optimizing a cost function applied to a correlation of parameters describing the geometric relationship between the curved surface of the spectacle lens substrate and the printhead with printing parameter values for the adjustable printing parameters.

2. The method as claimed in claim 1, wherein the at least two printing nozzle groups are to be used within a single printing pass.

3. The method as claimed in claim 1, wherein each printing nozzle group comprises a single printing nozzle.

4. The method as claimed in claim 1, the method further comprising:
(S1): obtaining input data concerning geometric features of the surface of the spectacle lens substrate and geometric features of the printhead,
wherein the printing parameter value is individually determined depending on the input data.

5. The method as claimed in claim 4, wherein the input data is used to determine a geometric relationship between the surface of the spectacle lens substrate and the printhead, and wherein the printing parameter value is individually determined depending on the geometric relationship.

6. The method as claimed in claim 5, wherein the geometric relationship refers to an alignment of the printhead and the spectacle lens substrate relative to each other.

7. The method as claimed in claim 5, wherein the geometric relationship is described by at least one parameter selected from the group consisting of a displacement vector, a velocity vector, an incident angle α, a distance Δ, and an arc length s.

8. The method as claimed in claim 5, wherein the method step (S3) of individually determining the printing parameter value for the at least one adjustable printing parameter comprises providing a look-up table containing a correlation of the parameters describing the geometric relationship between the surface of the spectacle lens substrate and the printhead with printing parameter values for the adjustable printing parameters.

9. The method as claimed in claim 8, wherein individually determining the printing parameter values includes deriving a set of printing parameter values from the look-up table for the data points.

10. The method as claimed in claim 4, wherein the input data comprises data concerning an environmental condition, a non-adjustable ink property, and/or a material property of the spectacle lens substrate.

11. The method as claimed in claim 1, wherein deducing the parameter map includes converting the surface of the spectacle lens substrate into a grid of data points.

12. The method as claimed in claim 1, wherein the printing parameter value for the at least one adjustable printing parameter of each printing nozzle group is individually determined such that a tilt angle of the printhead relative to the surface of the spectacle lens substrate does not have to be adjusted prior to printing and/or during printing.

13. A method for inkjet printing, wherein a pattern is printed on a surface of a spectacle lens substrate comprising a curved surface with an inkjet printing device including a printhead as one single component with a plurality of printing nozzles using a printing parameter value for at least one adjustable printing parameter, wherein the printing parameter value for the at least one adjustable printing parameter is determined according to the computer-implemented method as claimed in claim 1.

14. The method as claimed in claim 13, wherein a tilt angle of the printhead relative to the surface of the spectacle lens substrate is not adjusted prior to printing and/or during printing.

15. The method as claimed in claim 1, wherein the at least one adjustable printing parameter is adjusted such that neighboring droplets of the pattern to be printed on the surface of the spectacle lens coalesce before solidifying.

16. A data processing system comprising:
a processor; and
a storage medium coupled to the processor,
wherein the processor is configured to determine printing parameter values of an inkjet printing device for printing a pattern on a surface of a spectacle lens substrate having a curved surface, the inkjet printing device including a printhead as one single component with a plurality of printing nozzles, based on a computer program stored on the storage medium, wherein the processor is configured to group the plurality of printing nozzles into at least two printing nozzle groups and individually determine a printing parameter value for at least one adjustable printing parameter of each printing nozzle group, wherein the at least one adjustable printing parameter is selected from the group consisting of ejection temperature, jetting duration, jetting frequency, norm value, a wave form parameter, and an adjustable ink property, wherein the method step (S3) of individually determining the printing parameter value for the at least one adjustable printing parameter comprises deducing a parameter map including assigning different printing parameters to different regions of the curved surface, and wherein the parameter map is deduced by optimizing a cost function applied to a correlation of parameters describing the geometric relationship between the curved surface of the spectacle lens substrate and the printhead with printing parameter values for the adjustable printing parameters.

17. The data processing system as claimed in claim 16, wherein the processor is configured to individually determine the printing parameter value depending on geometric features of the spectacle lens substrate and geometric features of the printhead.

18. A computer program comprising instructions which, when the program is executed by a computer, cause the computer to:

determine printing parameter values of an inkjet printing device for printing a pattern on a surface of a spectacle lens substrate having a curved surface, the inkjet printing device including a printhead as one single component with a plurality of printing nozzles, wherein the instructions cause the computer to group the plurality of printing nozzles into at least two printing nozzle groups and individually determine a printing parameter value for at least one adjustable printing parameter of each printing nozzle group, wherein the at least one adjustable printing parameter is selected from the group consisting of an ejection temperature, a jetting duration, a jetting frequency, a norm value, a wave form parameter, and an adjustable ink property, wherein the method step (S3) of individually determining the printing parameter value for the at least one adjustable printing parameter comprises deducing a parameter map including assigning different printing parameters to different regions of the curved surface, and wherein the parameter map is deduced by optimizing a cost function applied to a correlation of parameters describing the geometric relationship between the curved surface of the spectacle lens substrate and the printhead with printing parameter values for the adjustable printing parameters.

19. A non-transitory computer-readable storage medium comprising instructions which, when executed by a computer, cause the computer to:

determine printing parameter values of an inkjet printing device for printing a pattern on a surface of a spectacle lens substrate having a curved surface, the inkjet printing device including a printhead as one single component with a plurality of printing nozzles, wherein the instructions cause the computer to group the plurality of printing nozzles into at least two printing nozzle groups and individually determine a printing parameter value for at least one adjustable printing parameter of each printing nozzle group, wherein the at least one adjustable printing parameter is selected from the group consisting of an ejection temperature, a jetting duration, a jetting frequency, a norm value, a wave form parameter, and an adjustable ink property, wherein the method step (S3) of individually determining the printing parameter value for the at least one adjustable printing parameter comprises deducing a parameter map including assigning different printing parameters to different regions of the curved surface, and wherein the parameter map is deduced by optimizing a cost function applied to a correlation of parameters describing the geometric relationship between the curved surface of the spectacle lens substrate and the printhead with printing parameter values for the adjustable printing parameters.

20. An inkjet printing device for printing a pattern on a surface of a spectacle lens substrate having a curved surface, the inkjet printing device comprising:

a printhead as one single component with a plurality of printing nozzles; and a data processing system including a processor and a storage medium coupled to the processor, wherein the processor is configured to determine printing parameter values based on a computer program stored on the storage medium, wherein the processor is configured to group the plurality of printing nozzles into at least two printing nozzle groups and individually determine a printing parameter value for at least one adjustable printing parameter of each printing nozzle group, wherein the at least one adjustable printing parameter is selected from the group consisting of an ejection temperature, a jetting duration, a jetting frequency, a norm value, a wave form parameter, and an adjustable ink property, wherein the method step (S3) of individually determining the printing parameter value for the at least one adjustable printing parameter comprises deducing a parameter map including assigning different printing parameters to different regions of the curved surface, and wherein the parameter map is deduced by optimizing a cost function applied to a correlation of parameters describing the geometric relationship between the curved surface of the spectacle lens substrate and the printhead with printing parameter values for the adjustable printing parameters.

* * * * *

UNITED STATES PATENT AND TRADEMARK OFFICE
CERTIFICATE OF CORRECTION

PATENT NO. : 12,415,350 B2
APPLICATION NO. : 18/437375
DATED : September 16, 2025
INVENTOR(S) : Florian Launay, Christian Wolff and Harshvardhan Yadwad Page 1 of 1

It is certified that error appears in the above-identified patent and that said Letters Patent is hereby corrected as shown below:

In the Specification

In Column 29, Line 19: change "$C = \$ * \pi * A / P^2$" to -- $C = 4 * \pi * A / P^2$ --

Signed and Sealed this
Twenty-fifth Day of November, 2025

John A. Squires
*Director of the United States Patent and Trademark Office*